United States Patent
Cohen

(10) Patent No.: US 10,773,971 B2
(45) Date of Patent: Sep. 15, 2020

(54) METHOD AND ARRANGEMENT FOR RECOVERY OF SALT

(71) Applicant: EasyMining Sweden AB, Uppsala (SE)

(72) Inventor: Yariv Cohen, Uppsala (SE)

(73) Assignee: EASYMINING SWEDEN AB, Uppsala (SE)

( * ) Notice: Subject to any disclaimer, the term of this patent is extended or adjusted under 35 U.S.C. 154(b) by 274 days.

(21) Appl. No.: 16/064,069

(22) PCT Filed: Dec. 19, 2016

(86) PCT No.: PCT/SE2016/051282
§ 371 (c)(1),
(2) Date: Jun. 20, 2018

(87) PCT Pub. No.: WO2017/111685
PCT Pub. Date: Jun. 29, 2017

(65) Prior Publication Data
US 2019/0337816 A1 Nov. 7, 2019

(30) Foreign Application Priority Data
Dec. 21, 2015 (SE) ..................................... 1551685

(51) Int. Cl.
*C01F 11/32* (2006.01)
*C02F 1/52* (2006.01)
(Continued)

(52) U.S. Cl.
CPC ............ *C01F 11/32* (2013.01); *C02F 1/5236* (2013.01); *C02F 2101/12* (2013.01);
(Continued)

(58) Field of Classification Search
CPC ....................................................... C02F 11/32
See application file for complete search history.

(56) References Cited

U.S. PATENT DOCUMENTS 2,788,257 A   4/1957   Duke
2,839,360 A   6/1958   Gump et al.
(Continued)

FOREIGN PATENT DOCUMENTS

CN   202007141 U   10/2011
CN   102432038 A   5/2012
(Continued)

OTHER PUBLICATIONS

Freilich, M.B. et al., Potassium Compounds, Kirk-Othmer Encyclopedia of Chemical Technology (online publication Sep. 15, 2014).
(Continued)

*Primary Examiner* — Peter Keyworth
(74) *Attorney, Agent, or Firm* — Porter Wright Morris & Arthur LLP

(57) ABSTRACT

A method for recovery of salts comprises providing (210) of an initial aqueous solution comprising ions of Na, K, Cl and optionally Ca or a material which when brought in contact with water forms an initial aqueous solution comprising ions of Na, K, Cl and optionally Ca. The start material is treated (230) into an enriched aqueous solution having a concentration of $CaCl_2$ of at least 15% by weight. The treatment (230) comprises at least one of reduction of water content and addition of Ca. The treatment (230) generates a solid mix of Na Cl and KCl. The solid mix of NaCl and KCl is separated (235) from the enriched aqueous solution, giving a depleted aqueous solution comprising ions of Ca and Cl as main dissolved substances. An arrangement for recovery of salts is also disclosed.

20 Claims, 14 Drawing Sheets

(51) Int. Cl.
    *C02F 101/12*   (2006.01)
    *C02F 103/18*   (2006.01)
(52) U.S. Cl.
    CPC ...... *C02F 2103/18* (2013.01); *C02F 2209/02* (2013.01); *C02F 2305/14* (2013.01)

(56) References Cited

U.S. PATENT DOCUMENTS

| | | |
|---|---|---|
| 3,212,863 A | 10/1965 | Goodenough et al. |
| 3,279,897 A | 10/1966 | Goodenough et al. |
| 3,359,079 A | 12/1967 | Bathellier |
| 3,870,585 A | 3/1975 | Kearns et al. |
| 3,900,553 A | 8/1975 | Nylander |
| 5,769,906 A | 6/1998 | Kremer et al. |
| 6,319,482 B1 | 11/2001 | Sawell et al. |
| 2012/0205253 A1 | 8/2012 | Blondel et al. |

FOREIGN PATENT DOCUMENTS

| | | |
|---|---|---|
| CN | 203853372 U | 10/2014 |
| JP | 10216671 A | 8/1998 |
| JP | 2003001218 A | 1/2003 |
| JP | 2011148646 A | 8/2011 |
| SU | 929556 A1 | 5/1982 |

OTHER PUBLICATIONS

Tang et. al., Recovery of soluble chloride salts from the wastewater generated during the washing process of municipal solid wastes incineration fly ash, Environmental Technology, vol. 35, No. 22, pp. 2863-2869 (online publication Jun. 17, 2014).

C. Balarew, et al., Improved Treatment of Waste Brines, The European Conference on Marine Science and Oceantechno, vol. 2, pp. 551-554 (Aug. 29, 2000).

Supplemental Search Report dated Jul. 31, 2019 from corresponding European Application No. 16879481.6.

METHOD AND ARRANGEMENT FOR RECOVERY OF SALT

TECHNICAL FIELD

The present invention relates in general to processing materials containing at least sodium, potassium, chloride, and optionally calcium. In particular the invention relates to such processing focussing on recovering mentioned cations as their respective chloride salts in different qualities.

BACKGROUND

Combustion of fuels such as wood, coal, etc. and incineration of wastes such as municipal wastes, industrial wastes, etc. is a common practice to reduce the amounts of waste and to recover its energy content. Incineration results in production of by-products such as ashes (bottom ash and fly ash) and by-products from gas cleaning operations.

Air pollution control (APC) by-products originate from the treatment of the gas and particles coming out from the incineration chamber. Examples for treatment operations for air pollution control include electrostatic filters for separation of particulate impurities often called fly ash, dry scrubbers for separation of gaseous impurities such as hydrogen chloride, hydrogen fluoride, sulphur dioxide, etc. e.g. by reaction with lime, wet scrubbers for removal of gaseous impurities by scrubbing in an aqueous solution such as an acid, neutral solution or base, and treatment of aqueous effluents generated from scrubbing operations and condensation operations by various wastewater treatment technologies.

Air pollution control (APC) by-products are materials composed of primarily inorganic compounds. The major components are generally Ca, Si, Cl, K, Na, Al, Zn, and Pb. APC by-produces contain also other elements such as iron, phosphorus and a range of heavy metals such as Ti, Cd, Ni, Cr, Cu, B, etc.

APC by-products have generally a very high content of water-soluble chloride salts which makes disposal of APC by-products difficult and costly. In Sweden, waste material for disposal is generally classified according to four categories regarding its water-soluble chloride content as measured by standard leaching tests: inert waste (<800 mg Cl per kg dry matter), non-hazardous waste (800-15 000 mg Cl per kg dry matter), hazardous waste (15 000-25 000 mg Cl per kg dry matter), and material exceeding the criteria for hazardous waste (>25 000 mg Cl per kg dry matter).

In general, the content of water soluble chlorides in APC by-products is in the order of 50 000 to 200 000 mg Cl per kg dry matter, thus exceeding the criteria for hazardous waste disposal. Since disposal is prohibited, one common practice is to export the APC by-products and dispose it in special old mines.

The problems of disposing APC by-products have led to the development of methods to wash APC by-products from their soluble chloride content to enable disposal of the washed material as non-hazardous waste. The relatively high content of zinc in APC by-products has also led to development of methods of combining washing of APC by-products to reduce chloride content with zinc recovery. Such processes are based on washing of APC by-products with an acid to dissolve their zinc content followed by recovery of zinc by precipitation as hydroxides or recovery of zinc in elemental form by using a combination of solvent extraction and electroplating on cathodes.

Washing of APC by-products with water or acid results in a wastewater containing a mixture of chloride salts together with other impurities such as heavy metals, etc. The wastewater has often to be treated for removal of impurities such as heavy metals, sulfate, ammonia, etc. before being discharged into a recipient.

Chloride is a water-soluble anion which is not precipitated during zinc recovery as zinc hydroxide, and not extracted by solvents used for zinc extraction for production of elemental zinc by electroplating. Chloride is also not removed from solution by chemical treatment in wastewater treatment plants. The effluent from washing of APC by-products is thus saline and in many cases exceeds the limits for being discharged to a municipal wastewater treatment plant due to corrosion aspects and toxic effect on bacteria in the biological treatment plant. The common practice is to discharge such effluent directly into the sea.

However, in many cases landfills or incinerators are located far from the sea in locations in which there are strict limits regarding discharge of chlorides to a recipient. In these locations it is not possible to wash or recover zinc from APC by-products without taking care of the soluble chloride salts since it is prohibited to discharge the saline effluent.

It is known in the art to treat problematic effluents with so called zero liquid discharge systems (ZLD). In these systems a saline effluent is treated usually by vacuum evaporation to reduce the amount of generated waste and to recover a purified condensate which can be used as potable water or being discharged to a recipient.

Wash-water from treatment of APC by-products can be treated with a ZLD system instead of treatment in a wastewater treatment plant with subsequent discharge of saline effluent. In this way discharge of a saline effluent can be avoided. Use of ZLD system for treating saline effluents such as wastewater from flue gas cleaning operations is becoming more and more common. ZLD systems are also used for treatment of saline effluents not originating in incineration operations. Examples include, wastewater from shale gas fracking operation, RO desalination concentrates, ion exchange softeners concentrate, landfill leachate, mine waters, etc.

A main disadvantage of zero liquid discharge systems is production of a by-product salt mixture. The by-product salts of ZLD systems are usually hygroscopic in nature, i.e. it's a moist paste of a water-soluble salt mixture with no end use. Such by-products cannot be disposed in a landfill as hazardous waste due to risk for leaching of water-soluble salts. The by-product waste must usually be disposed at special locations e.g. in salt mines.

Potassium is a resource which is mainly used as a raw material for production of fertilizers. Today potassium is extracted from limited rock deposits of minerals such as syvine (KCl), kainite (KCl.MgSO$_4$.3H$_2$O), carnallite (KCl.MgCl$_2$.6H$_2$O) usually together with kainitite (NaCl) by conventional mining or by solution mining, i.e. dissolving the rock with a solution that can be pumped from the mine to the processing plant. Potassium is also recovered from salt lakes usually by natural evaporation forming crystallization of a mixture of carnallite and kainitite which is thereafter processed for separation and recovery of potassium chloride. Potassium resources are limited and the major part of the currently known world's reserves are located in only two countries Canada and Russia. Therefore, there is a general environmental interest in recovering potassium salts from wastes such as from APC by-products in order to increase the life time of non-renewable limited rock deposits.

In general, there is a strong interest in society to convert wastes into products thus to minimize the need for mining natural resources. Such approaches contribute to reduce the negative environmental effects associated with mining of natural resources. Furthermore, there is a general environmental interest to convert wastes into products in order to minimize disposal of wastes with associated negative environmental impact and to obtain other benefits such as reduction of energy use due to recycling, etc.

The saline leach solution from washing of APC by-products typically comprises of a mixture between calcium, sodium, and potassium chloride salts. However, the relative amounts of the different salts differ from time to time and from plant to plant. Especially if APC by-products originating from several incinerators are to be washed in a single central plant.

The U.S. Pat. No. 6,319,482 discloses treatment of fly ash/APC residues including lead salt recovery. The fly ash/APC residues have a high content of $CaCl_2$, which is of interest for recovery. In a first stage, fly ash/APC residues are washed followed by a phase separation to obtain a first calcium enriched filter and a filtrate. In a second step, the filtrate is processed for metal recovery by pH adjustment. In a third stage, the remaining brine is concentrated by evaporation to recover a concentrated and purified calcium chloride brine. Precipitated mixture of KCl and NaCl is removed as a side product and dumped as disposal or used as road salt. The main goal of the process is to recover $CaCl_2$, which unfortunately leave the disposal of the NaCl and KCl mix essentially unaddressed. The use of a mix of NaCl and KCl as road salt is furthermore not optimal, since the KCl content mainly contributes to fertigation of the environment but is not very efficient for reduction of the water melting point. The focus on recovery of $CaCl_2$ also results in that the process is only operable on initial materials having a high $CaCl_2$ content.

In the publication "Recovery of soluble chloride salts from the wastewater generated during the washing process of municipal solid wastes incineration fly ash" by H. Tang et al in Environmental Technology, 2014, vol. 35, No. 22, pp 2863-2869, recovery of chloride salts from municipal waste incineration fly ash is discussed. A method to separate the three salts is suggested. The wash solution is evaporated in three different evaporators to obtain three different fractions of crystallized salts. In a first fraction, almost pure NaCl is obtained. In a second fraction, a mix between NaCl and KCl is obtained. After dissolving this fraction into water, ethanol is added, resulting in precipitation of pure KCl. A third fraction comprises the remaining NaCl together with some KCl and $CaCl_2$, leaving a solution of only KCl and $CaCl_2$. The third fraction is returned to the start solution, while the KCl and $CaCl_2$ in the solution are separated by addition of ethanol, precipitating KCl and leaving the $CaCl_2$ in the final solution. The process is complex and high in capital costs due to the need for three evaporators. If the ethanol is to be reused, distillation steps have to be performed, making the process complex and energy-consuming.

In the published Japanese application JP 2011-14846A, recovery of KCl from municipal waste incineration fly ash is disclosed. During the washing of the ash the $CaCl_2$ is caused to precipitate into the remaining ash by addition of carbon dioxide, forming $CaCO_3$. The KCl is separated at a low temperature <20° C. A main disadvantage of this process is requirement for a large amount of carbon dioxide. Furthermore, since conversion of $CaCl_2$ to $CaCO_3$ requires balancing the released Cl anion with a cation, large amount of base such as NaOH is usually required in order for the process to obtain reasonable yield of $CaCl_2$ conversion. In addition, $CaCl_2$ is not recovered in the process, instead it is transformed into $CaCO_3$ in the fly ash increasing the amounts required to be disposed and associated costs considerably.

U.S. Pat. No. 2,839,360 discloses a method for reducing the concentration of alkali metal salts in calcium chloride brines by forming a double salt between KCl and $CaCl_2$. U.S. Pat. Nos. 3,279,897 and 3,212,863 disclose a method for precipitating KCl from salt mixtures by addition of ammonia. U.S. Pat. No. 3,359,079 discloses a method for precipitation of potassium halides from mixed brines using organic solvents. Use of ammonia or organic solvents for recovery of potassium chloride requires complex distillation systems and usually also several evaporators which makes the process complex and energy consuming.

There is a need for a method that can enable to separate and recover chloride salts form APC by-products, ZLD by-products and saline effluents in form of commercial products (with possibility for different levels of purity) for sale. Such an approach will solve one of the disposal problems of APC by-products independent on the location for operation. Furthermore, the costly disposal of ZLD by-products will be omitted.

In Sweden it is common to use sodium chloride for deicing of roads. The use of road salt in Sweden is about 300 000 tons per annum. It is common to spread sodium chloride as a 23% by weight solution. Spreading sodium chloride in a liquid form has the advantage of fast reaction compared to spreading solid sodium chloride, this since solid sodium chloride needs to absorb heat from the environment in order to dissolve into a solution which can act as a deicer.

Getting the road to dry up as quickly as possible is important in connection with deicing. The risk of re-freezing minimizes when the road surface becomes dry. The number of road salt spreading operations become fewer which enables saving on both fuel and chemicals. Use of sodium chloride as a road salt is generally known to cause the road to dry up fast. In contrast, by using calcium chloride as a road salt, the roads does not dry as fast since calcium chloride is an hydroscopic salt which keeps moisture in the roadway. Therefore, use of pure calcium chloride as a road salt for deicing purposes has a significant disadvantage compared to use of sodium chloride.

Using pure sodium chloride as a road salt has also disadvantages. The main disadvantage of pure sodium chloride is that its effect decreases when the temperature drops down to the range of about −5 to −7° C., and has no effect at all below −9° C. In contrast, calcium chloride is effective down to −20° C. (Theoretically, under ideal conditions down to −40° C.).

There is a need for a simple process for separating and recovering $CaCl_2$, NaCl and KCl in essentially pure forms from their mixtures. There is also a need for a process enabling separation of three salts without a need for distillation of organic solvents or multiple evaporation steps. There is further a need for a robust salt recovery process that can handle the large variability in the ratios of the salts in the feed over time since composition and ratios of elements in wastes vary very much over time and total amounts are much smaller in comparison to mineral reserves or salt lakes. There is an additional need for a salt recovery process from washing APC by-products to enable operation in locations in which discharge of saline effluents is prohibited. There is a need for a process that can enable processing saline effluents without generation of problematic by-product wastes. There is a need for a process that can enable to reduce chloride content in APC by-products to enable disposal in landfill and at the same time minimize the weight of material being disposed. There is also a need for a process that can enable to recover potassium from APC/ZLD by-products in a pure form suitable for use as a raw material for e.g. fertilizers. There is an additional need for a process that can enable to recover sodium chloride from APC/ZLD by-products in a pure form suitable for use as road salt or a raw material for e.g. chlor-alkali industry. There is further a need for a process that can enable to recover calcium chloride from fly ash APC/ZLD by-products in a pure form suitable for use as e.g. deicing or dust control material or as a raw material for industrial processes. There is a general need for processes that enable to convert wastes into products.

SUMMARY

A general object of the present technical presentation is thus to provide arrangements and methods for separating and recovering commercial purity grades of $CaCl_2$, NaCl and/or KCl from mixtures thereof in a cost and power efficient way.

The above object is achieved by methods and devices according to the independent claims. Preferred embodiments are defined in dependent claims.

In general words, in a first aspect, a method for recovery of salts comprises providing of a start material comprising at least one of an initial aqueous solution comprising ions of Na, K, Cl and optionally Ca, and a material, which when brought in contact with water forms an initial aqueous solution comprising ions of Na, K, Cl and optionally Ca. The start material is treated into an enriched aqueous solution having a concentration of $CaCl_2$ of at least 15% by weight. The treatment comprises at least one of reduction of water content and addition of at least Ca. The treatment generates a solid mix of NaCl and KCl. The solid mix of NaCl and KCl is separated from the enriched aqueous solution, giving a depleted aqueous solution comprising ions of Ca and Cl as main dissolved substances.

In a second aspect, an arrangement for recovery of salts, comprises an input section and a first stage section. The first stage section comprises a treatment arrangement and a salt mix separator. The input section is arranged for providing a start material comprising at least one of an initial aqueous solution comprising ions of Na, K, Cl and optionally Ca, and a material, which when brought in contact with water forms an initial aqueous solution comprising ions of Na, K, Cl and optionally Ca to the first stage section. The treatment arrangement is arranged for treating the start material provided from the input section into an enriched aqueous solution having a concentration of $CaCl_2$ of at least 15% by weight, whereby a solid mix of NaCl and KCl is generated. The treatment arrangement comprises at least one of a water reduction arrangement and an input for additives. The water reduction arrangement is arranged for removing water from the initial aqueous solution. The input for additives is arranged for adding at least Ca ions into the initial aqueous solution. The salt mix separator is arranged for separating the solid mix of the NaCl and KCl from the enriched aqueous solution, giving a depleted aqueous solution comprising ions of Ca and Cl as main dissolved substances.

One advantage with the proposed technology is that the salt recovery process is cost and energy efficient as well as being robust concerning large variability in the ratios between different salts in the raw material. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
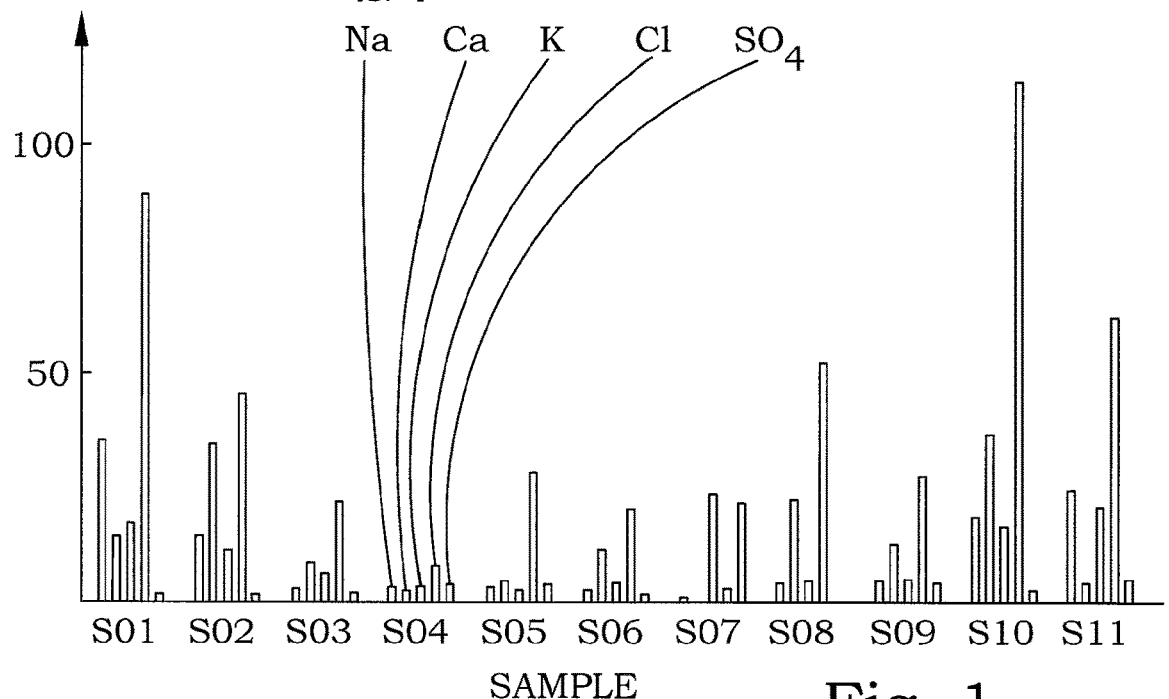
FIG. 1 is a graphic illustration of the elemental composition of APCBP leach-solution originating from different APC by-products.

Throughout the drawings, the same reference numbers are used for similar or corresponding elements. Some often used terminology in the present disclosure is to be interpreted as follows:

Air pollution control (APC) by-products—By-products resulting from the treatment of gas and particles coming out from the incineration chamber. For example, by-products from electrostatic filters often called fly ash, by-products from dry scrubbing of gaseous impurities, by-products from wet scrubbing of gaseous impurities, by-products from treatment of wastewater generated during air pollution control, etc.

Waste incineration (WI) by products—By-products resulting from incineration operation including bottom ash and air pollution control (APC) by-Products Air pollution control by-products (APCBP) leach-solution—solution resulting from contacting air pollution control (APC) by-products with an aqueous solution such as water, salt solution, acid solution or base solution By "solid" substances being present in contact with a solution is understood precipitated substances and/or non-dissolved substances.

For a better understanding of the proposed technology, it may be useful to begin with a brief overview of waste treatment.

Incineration is a common method for municipal solid waste treatment achieving up to ca 90 percent volume reduction and up to ca 75 percent mass reduction. Combustion of municipal wastes enables destruction of pathogens and organic contaminants, as well as possible recovery of energy in form of heat and/or electricity. During the incineration of municipal wastes, air pollution control by-products (APCBP) are generated resulting from the treatment of flue gas coming out from the incineration chamber. APC by-products are often considered as hazardous waste when being disposed in a landfill due to high content of water-soluble chloride salts and heavy metal content. The chemical composition of APC by-products depends on the type of waste being incinerated, incineration process, and on process for flue gas treatment as well as wastewater treatment for aqueous effluents. Typical compositions of APC by-products in Sweden are as follows: major components by weight are Ca (20-40%), Si (5-20%), Cl (10-50%), K (1-6%), Na (1-8%), Zn (1-6%) and Al (1-8%). Other elements include Fe (0.5-3%), P (0.05-4%), Mg (1-4%), Ti (0.1-2%), etc. Heavy metals such as Pb, Ti, Cd, Ni, Cr, Cu, B, etc. are usually present in concentrations in the range of 0.001 to 1% by weight. The organic carbon content depends to a large extent on the incineration process and varies usually between 0.2% up to 10% by weight. Inorganic carbon is usually low below 2% by weight.

Inorganic water-soluble salts in APC by-products, especially chlorides, hold a potential risk of leaching when disposed in landfill. Therefore, APC by-products are usually classified as hazardous waste according to chloride content when being disposed in a landfill. It is known that water-washing of APC by-products can extract the soluble salts and improve the quality of the washed residue to enable disposal in some cases even as non-hazardous waste. Full-scale plants are already in operation for washing APC by-products from their water-soluble chloride salt content.

However, as discussed before, in many cases, disposal of saline effluents generated in washing operation is problematic. Therefore there is a need for a method that can enable to recover chloride salts from APC by-products washing operations in form of commercial products for sale in order to solve disposal problems, improve the economy of the treatment process, and enable operation in locations lacking the possibility for discharging saline effluents.

It is known in the art to separate sodium chloride and potassium chloride from their mixtures. The principle for such separation is that the solubility of potassium chloride is increasing and that of sodium chloride is decreasing with increasing temperatures. And, of course, in the opposite direction, the solubility for potassium chloride is decreasing and that of sodium chloride is increasing with decreasing temperatures. Mixtures of sodium chloride and potassium chloride can be present in brines from solution-mining of solid minerals, in salt lakes, brines from sea water desalination, etc. The common way to process such mixtures of sodium chloride and potassium chloride is to crystallize a part of the sodium chloride by evaporation of water, and thereafter to cool the solution to crystallize a part of the potassium chloride. The next step is to recycle and mix the outflow from potassium chloride crystallization with new feed brine and repeat the process. In the mining industry, large volumes of equilibration basins usually guaranty a relatively constant ratio between the dissolved salts (NaCl and KCl) which enable relatively constant settings for operation. It can further be noted that, when separating NaCl and KCl in the mining industry, calcium chloride is generally absent.

However, a main problem when attempting to recover chloride salts from APCBP leach-solution is that the ratio between the different salts varies greatly with time. FIG. 1 shows examples of salt ratios in APCBP leach-solution from different APC by-products having different origin. There is generally a difference in composition between the APC by-products depending on the type of waste being incinerated, process used for incineration, and flue gas treatment. Furthermore, even for APC by-products originating from the same incineration and flue gas treatment there is usually variations in composition with time as the waste fuel composition can vary with time. The variations in elemental composition with time makes it difficult to recover sodium chloride and potassium chloride from APCBP leach-solution according to state-of-the-art principles since operation is usually in much smaller scale compared to the mining industry and therefore it is costly and not always possible to have large equilibration basins for obtaining a relative constant composition of solution.

Chinese patent application CN202007141U suggests recovering sodium chloride and potassium chloride from municipal solid waste incineration fly ash by using the above described principles i.e. using a NaCl evaporator crystallizer and a KCl cooling reactor according to state-of-the-art. Since the NaCl and KCl in the fly-ash wash-water are provided in solution, the settings of the evaporator have to change according to different Na/K ratios which make operation difficult. Furthermore, as can be seen in FIG. 1, APCBP leach-solution commonly contains high levels of dissolved calcium chloride in addition to sodium chloride and potassium chloride. The origin of calcium chloride in APC by-products is usually from the reaction of lime (in fly ash, or added in the process) with hydrogen chloride formed during combustion of chlorine containing waste materials such as PVC, etc. It was surprisingly found that when calcium chloride is present in the APCBP leach-solution it changes the solubility behavior of NaCl and KCl, which makes the process according to CN202007141U impossible or at least very difficult to run when calcium chloride is present. It was found that in a high background concentration of calcium chloride the solubility behavior of NaCl and KCl change in the opposite direction as compared to in a solution free from calcium chloride. In addition, calcium chloride has a large "salting out" effect on both sodium chloride and potassium chloride which makes the separation of sodium chloride and potassium chloride according to the above described principles practically impossible.

In the cases in which calcium chloride is present in mineral feed solution used for extraction of potassium, such as in the Dead Sea in Israel/Jordan, a high content of dissolved magnesium enables a separation of KCl from the brine by crystallization of Carnallite. The separated brine containing dissolved calcium chloride is not recovered but pumped back to the sea.

Figure 2:
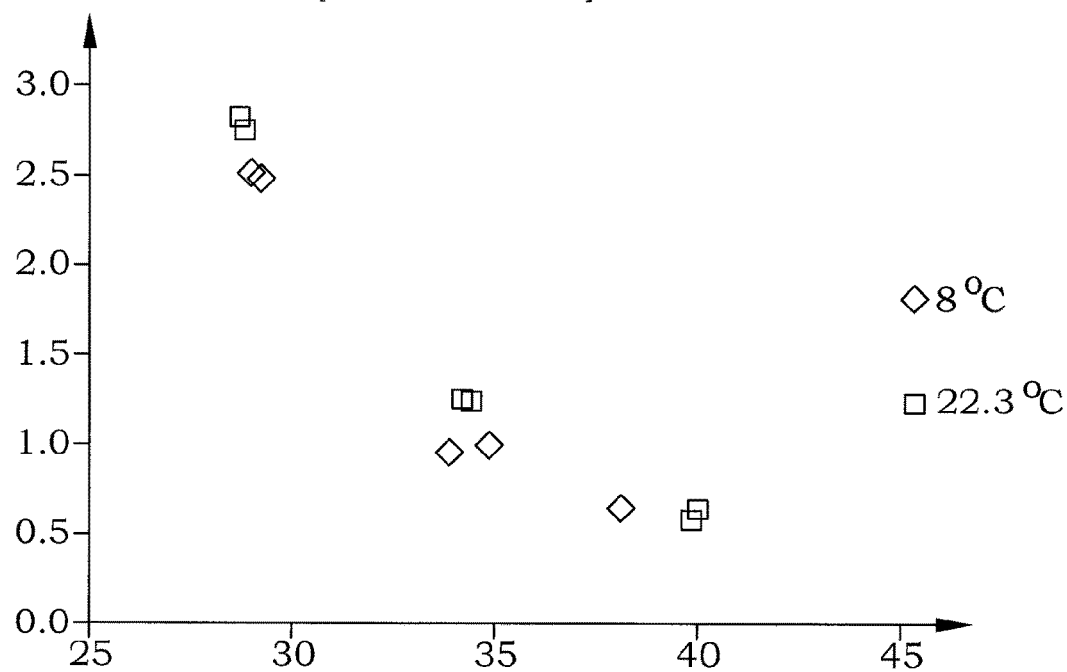
FIG. 2 is a graphic illustration of the solubility behavior of NaCl in the presence of KCl and $CaCl_2$ at two different temperatures.
Figure 3:
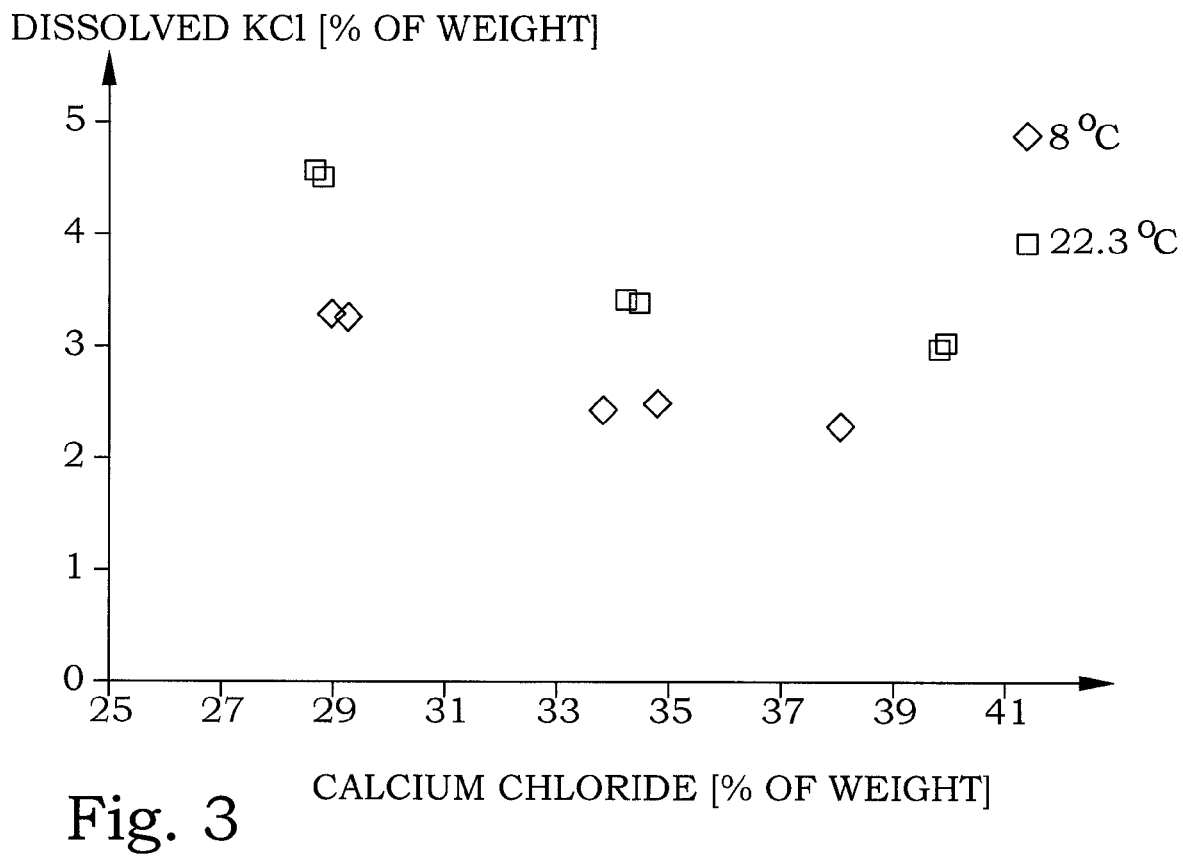
FIG. 3 is a graphic illustration of the solubility behavior of KCl in the presence of NaCl and $CaCl_2$ at two different temperatures.

FIGS. 2 and 3 shows experimental results obtained by the present inventor. FIG. 2 shows the solubility behavior of NaCl in the presence of KCl and $CaCl_2$ at two different temperatures and FIG. 3 shows the solubility behavior of KCl in the presence of NaCl and $CaCl_2$ at two different temperatures. FIGS. 2 and 3 show results from the same experiment. For example, residual Na concentration for a K concentration in FIG. 3 can be read from FIG. 2. From the figures it can be seen that calcium chloride has a large "salting out" effect on both NaCl and KCl which means that at higher concentration of $CaCl_2$ the residual concentrations of NaCl and KCl are lower. From the figures it can also be seen that lower temperatures result in somewhat lower residual concentrations of both NaCl and KCl. However, $CaCl_2$ concentration has a larger effect on "salting out" compared to temperature decrease.

Solubility data of the quaternary system NaCl—KCl—$CaCl_2$—$H_2O$ is available from a number of sources. In J. Chem. Eng. Data 2015, 60, pp 1886-1891, D. Li et al investigates equilibrium at 303.15 K. In Journal of Thermal Analysis and Calorimetry, vol. 95 (2009) 2, pp 361-367, D. Li et al investigates equilibrium at 308.15 K. In fluid Phase Equilibria 269 (2008) pp 98-103, T Deng et al investigates equilibrium at 288.15 K. In Russian Journal of Physical Chemistry A, 2011, Vol. 85, No. 7, pp 1149-1154, J-M Yang et al investigates solubility in the system NaCl—$CaCl_2$—$H_2O$ and KCl—$CaCl_2$—$H_2O$ at 75° C. In journal of Korean Chemical Society, 2010, Vol 54, No. 3, pp. 269-274, J-M Yang et al investigates solubility in the system NaCl—$CaCl_2$—$H_2O$ and KCl—$CaCl_2$—$H_2O$ at 50° C.

TABLE 1

Purity of calcium chloride solutions obtained after crystallization of alkali salts as a function of calcium chloride concentration and temperature

| Temperature (° C.) | Concentration of $CaCl_2$ (% of weight) | Purity of $CaCl_2$ solution (% $CaCl_2$) |
| --- | --- | --- |
| −16 | 40 | 94 |
| −6 | 30 | 85 |
| 7 | 30 | 83 |
| 7 | 35 | 91 |
| 7 | 40 | 93 |
| 22 | 30 | 80 |
| 22 | 35 | 88 |
| 22 | 40 | 92 |
| 22 | 50 | 92 |
| 50 | 55 | 90 |
| 70 | 60 | 94 |
| 85 | 40 | 82 |
| 85 | 55 | 90 |

Since only a limited data is available in the literature regarding the solubility behavior of mixtures of $CaCl_2$, NaCl, and KCl, the system of $CaCl_2$—NaCl—KCl—$H_2O$ was therefore experimentally investigated for a wide range of temperatures and concentrations. Table 2 shows the purity of calcium chloride solution obtained after crystallization of alkali salts (NaCl and KCl) as a function of calcium chloride concentration and temperature. From table 1 it can be seen that a purity of up to about 94% by weight can be obtained for a calcium chloride solution by "salting out" a mixture of sodium chloride and potassium chloride at certain combinations of calcium chloride concentrations and temperatures.

Since it was experimentally shown to be impossible or at least very difficult to separate pure NaCl and KCl from $CaCl_2$ containing solutions by conventional evaporation and cooling e.g. according to CN202007141U, the approach in the currently presented technology is to separate, at a first stage, a mixture of NaCl and KCl from a $CaCl_2$ solution and preferably in a second stage to separate NaCl and KCl from that mixture. The first stage thus uses the varying solubilities of NaCl and KCl in high-concentration $CaCl_2$ solutions to separate Ca from Na and K.

Figure 4:
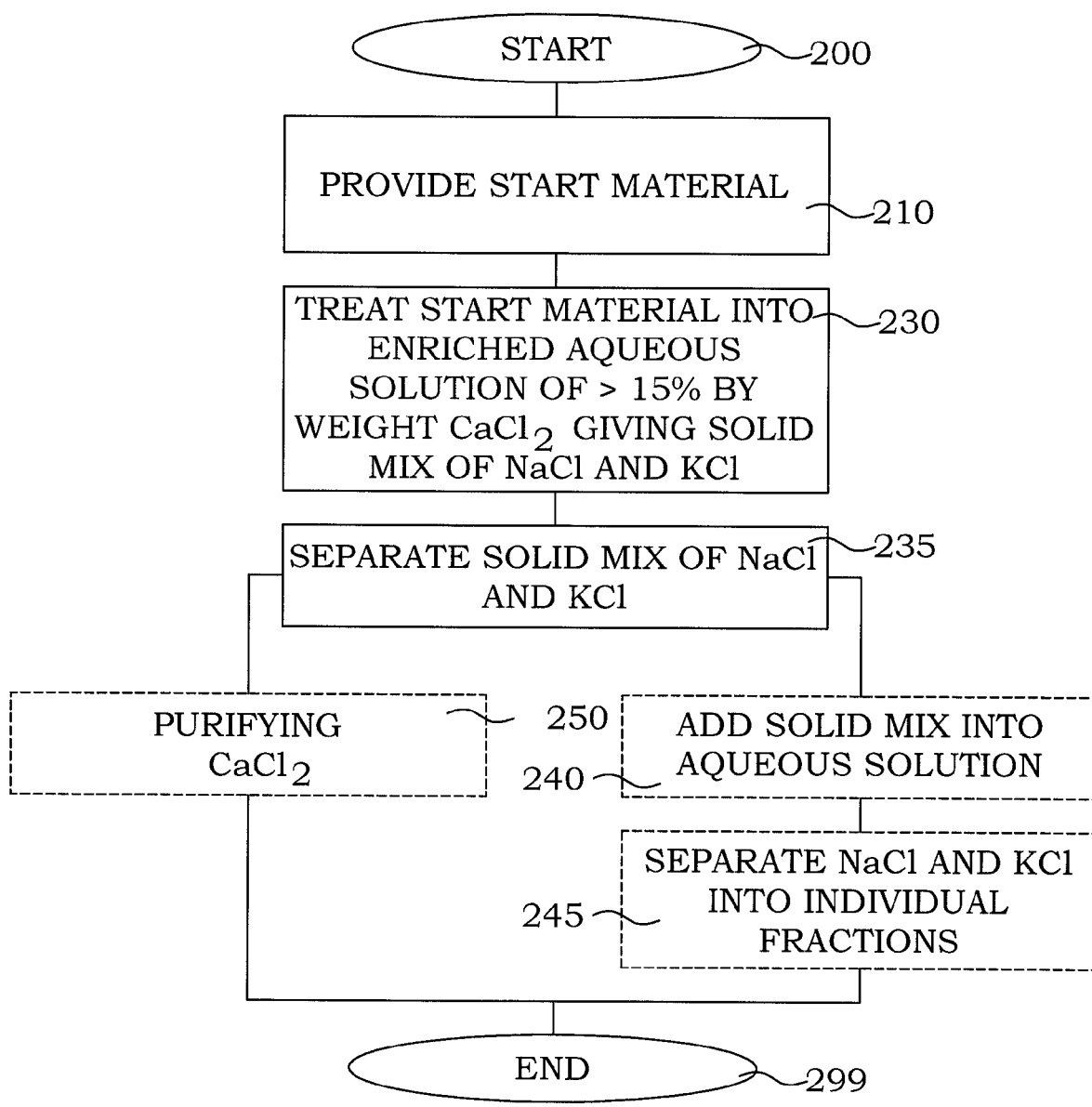
FIG. 4 is a flow diagram of steps of an embodiment of a method for recovery of salts.

FIG. 4 illustrates a flow diagram of steps of an embodiment of a method for recovery of salts. The process starts in step 200. In step 210, a start material comprising at least an initial aqueous solution or a start material, which when brought in contact with water forms an initial aqueous solution is provided. The initial aqueous solution comprises ions of Na, K, Cl and optionally Ca. In the typical case, the initial aqueous solution comprises Ca, since this was the origin of the present separation ideas. However, it is also possible to run the present processes on initial solutions having very low Ca content, since necessary Ca ion may be added into the process from other sources in a following step. In step 230, the initial aqueous solution is treated into an enriched aqueous solution having a concentration of $CaCl_2$ of at least 15% by weight. This treating step comprises reduction of water content and/or addition of Ca. This treatment step generates a solid mix of NaCl and KCl. This solid mix is a result of the previously discussed "salting out" effect. $CaCl_2$ is left in the solution, typically in a relatively pure form. In step 235, the solid mix of NaCl and KCl is separated from the enriched aqueous solution, thus giving a depleted aqueous solution comprising ions of Ca and Cl as main dissolved substances. This depleted aqueous solution may, however, comprise minor concentrations of e.g. NaCl and KCl. As will be discussed in connection with different embodiments, this enriched aqueous solution product may be used as it is or may be post-treated for instance to improve the purity or produce a solid product. The process ends in step 299.

In the figure, the steps 210 and 230 are illustrated as being two consecutive steps. However, in alternative embodiments, at least parts of the steps 210 and 230 may be performed simultaneous and/or in dependence of each other, or as one integrated step.

In one particular example, a ZLD solid waste product being composed of a solid mixture of $CaCl_2$, NaCl and KCl is fed into a reactor. The solid waste may contain residual moisture. The start material here comprises a material, which when brought in contact with water forms an initial aqueous solution comprising ions of Na, K, Cl and optionally Ca. An aqueous solution e.g. water is therefore also entered into the reactor. A waste product composed of solid $CaCO_3$ is added to the reactor and concentrated HCl is added into the reactor to convert the added $CaCO_3$ into $CaCl_2$ by release of $CO_2$. All reactants are agitated in room temperature. A solution of 35% $CaCl_2$ by weight is formed containing a mixture of NaCl and KCl, which is further processed. The ZLD solid waste is not completely dissolved in water to form an aqueous solution. A main part of the NaCl and KCl in the ZLD waste product may not dissolved at all but remain solid through the process. A start material then comprises the minor part of dissolved NaCl and KCl plus the solid mix of salts. The addition of Ca ions and Cl ions then gives the requested $CaCl_2$ content.

The mix of NaCl and KCl is of low value as such, and in order to recover valuable products, the mix has to be further processed in order to achieve NaCl and KCl in substantially pure fractions. In the U.S. Pat. No. 2,788,257, a crystallization process for recovering sylvite from sylvite ore is disclosed. An efficient recovery of high-purity KCl is obtained by saturating a brine with respect to KCl. However, NaCl being present in the residual side product becomes by such a process contaminated with residual amounts of KCl. Also in the publication "Potassium Compounds" by M. B. Freilich et al in Kirk-Othmer Encyclopedia of Chemical Technology, published on-line Sep. 15, 2004, a similar approach is suggested, giving a residue of unsolved NaCl mixed with some amount of KCl and possibly also clay. These procedures can therefore not be used, as such, for producing individual substantially pure fractions of both KCl and NaCl.

Some attempts, described in the literature, were made to recover salts from solution originating from water washing of fly ash originating from incineration of municipal wastes. Chinese utility patent application CN202007141U suggests recovering of sodium chloride and potassium chloride from such wash solution by using a NaCl evaporator crystallizer and a KCl cooling reactor. Since the NaCl and KCl are provided in solution, the settings of the evaporator have to change according to variations in Na/K ratios which make the operation very difficult. Furthermore, it was found by the present applicant that if calcium chloride is present in the solution it changes the solubility behavior of NaCl and KCl, which makes this process to be impossible or at least very difficult to run. When calcium chloride is present it is impossible or at least very difficult to crystallize pure salts of NaCl and KCl as described later in the text.

In the here proposed technology, the solid mix of NaCl and KCl is further processed. In further reference to FIG. 4, in step 240, the solid mix of NaCl and KCl is added into an aqueous solution. Thereby KCl and at least a part of the NaCl dissolves, to form a mixed aqueous solution. In particular embodiments, portions of the NaCl may remain in solid form. In step 245, NaCl and KCl are separated into individual fractions from the mixed aqueous solution. The steps 240 and 245 may be performed according to different processes, known as such in prior art. Examples of such processes are given e.g. in the background section or in the beginning of this detailed description section. Preferred embodiments will be discussed further below.

Figure 5:
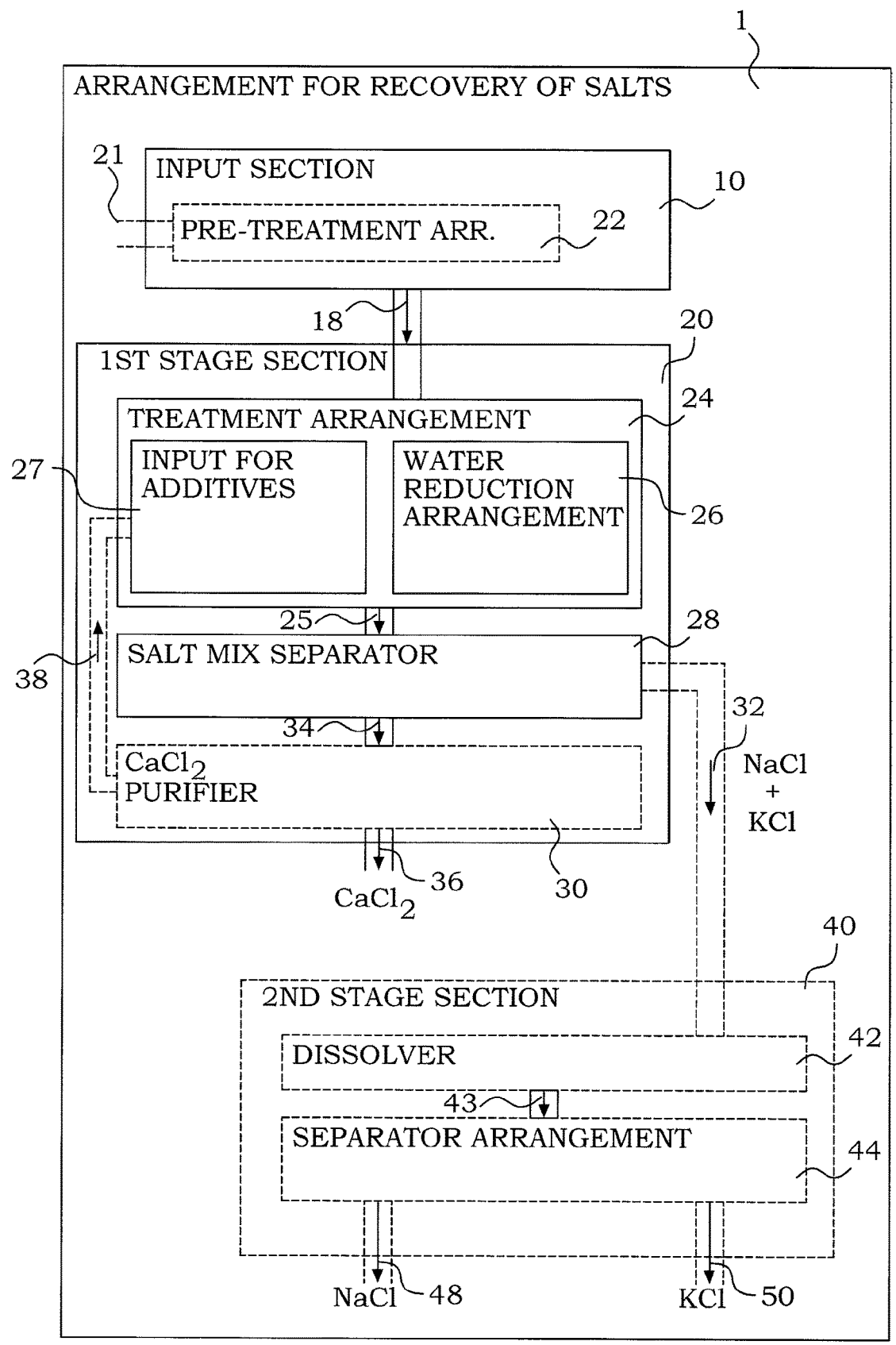
FIG. 5 is a block diagram of parts of an embodiment of an arrangement for recovery of salts.

FIG. 5 illustrates a block diagram of parts of an embodiment of an arrangement 1 for recovery of salts. The arrangement 1 for recovery of salts comprises an input section 10. This input section 10 may in certain embodiments just be an input for raw material, but may in other embodiments comprise process sections. This will be discussed more in detail further below. The input section 10 is anyway arranged for providing a start material 18 comprising at least one of an initial aqueous solution comprising ions of Na, K, Cl and optionally Ca, and a material, which when brought in contact with water forms an initial aqueous solution comprising ions of Na, K, Cl and optionally Ca. The arrangement 1 for recovery of salts further comprises a first stage section 20, connected to the input section 10 for receiving the start material 18 therefrom. In other words, the input section 10 is arranged for providing the start material 18 to the first stage section 20.

The first stage section 20 comprises a treatment arrangement 24 and a salt mix separator 28. The treatment arrangement 24 is arranged for treating the start material 18 provided from the input section 10 into an enriched aqueous solution 25 having a concentration of $CaCl_2$ of at least 15% by weight. The treatment arrangement 24 comprising at least one of a water reduction arrangement 26 and an input for additives 27. The water reduction arrangement 26 is arranged for removing water from the initial aqueous solution 18, for forming the enriched aqueous solution 25. The input for additives 27 is arranged for adding at least Ca ions and optionally Cl ions into the start material 18, for forming the enriched aqueous solution 25. Due to the "salting out" effect, a solid mix 32 of NaCl and KCl is generated. The salt mix separator 28 is arranged for separating the solid mix 32 of NaCl and KCl from the enriched aqueous solution 25, giving a depleted aqueous solution 34 comprising ions of Ca and Cl as main dissolved substances. As will be discussed in connection with different embodiments further below, this enriched aqueous solution 25 product may be used as it is or may be post-treated for instance to improve the purity.

In alternative embodiments, at least parts of the input section 10 may be implemented together with the treatment arrangement 24, being dependent on each other or even being integrated into one process unit, as discussed in a particular embodiment further above.

In a preferred embodiment, the solid mix of NaCl and KCl is further processed. In further reference to FIG. 5, the arrangement 1 for recovery of salts further comprises a second stage section 40 connected to the first stage section 20 for enabling transferring of the solid mix 32 of NaCl and KCl. The second stage section 40 comprises a dissolver 42 and a separator arrangement 44. The dissolver 42 is arranged for adding the solid mix 32 of NaCl and KCl into an aqueous solution. Thereby, KCl and at least a part of the NaCl is dissolved forming a mixed aqueous solution 43. The separator arrangement 44 is arranged for separating the NaCl 48 and KCl 50 into individual fractions from the mixed aqueous solution 43. The separation may be performed according to different processes, known as such in prior art. Examples of such processes are given e.g. in the background section or in the beginning of this detailed description section. Preferred arrangement embodiments will be discussed further below.

Exemplary embodiments will now be utilized to illustrate different aspects of methods and arrangements for salt recovery.

The start material may be provided in different ways. In one embodiment, the step of providing 210 (FIG. 4) a start material comprises dissolving of a salt containing material. Such material could e.g. in a particular embodiment be a ZLD material, at least partially dissolved in an aqueous solution. In a particular embodiment, the salt containing material can be a salt containing waste material.

Analogously, in one embodiment, the input section 10 (FIG. 5) is arranged for receiving the start material from an arrangement for dissolving of salt containing material, e.g. ZLD material, or generally salt containing waste material. Alternatively, the input section 10 (FIG. 5) may comprises an input for salt containing material, and a salt material dissolver arranged for dissolving the provided salt containing material into an initial aqueous solution. The initial aqueous solution may also comprise e.g. solid, precipitated or non-dissolved, NaCl and/or KCl.

Figure 6:
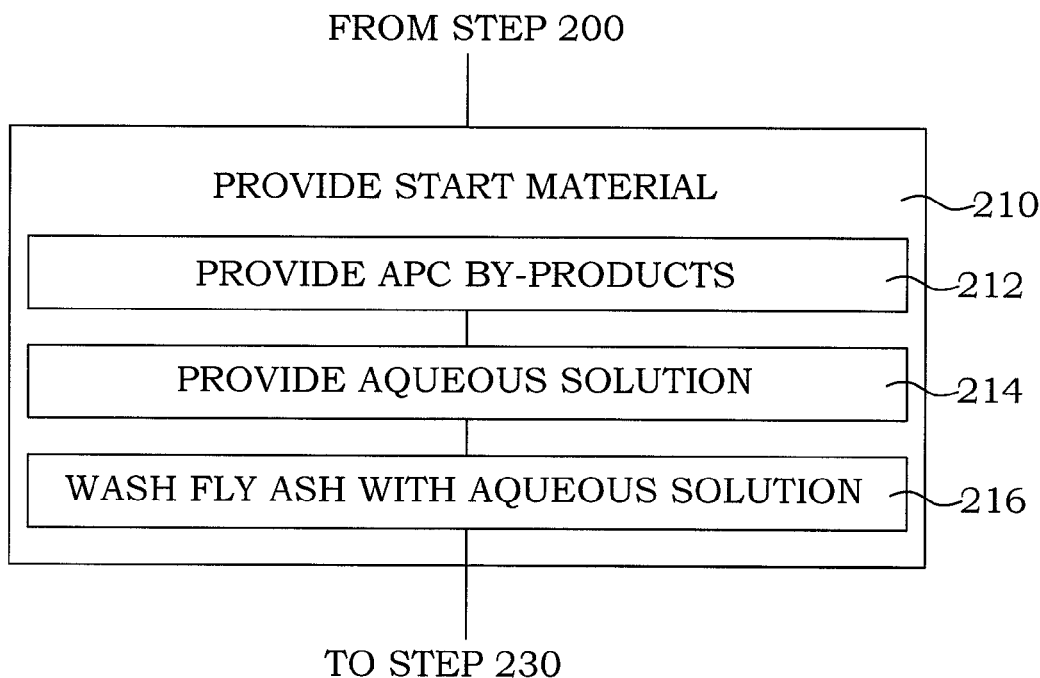
FIG. 6 is a flow diagram of part steps of an embodiment of a step of providing a start material.

In a particular embodiment, illustrated in FIG. 6, the step of providing 210 a start material comprises the step 212, in which APC by-products are provided and the step 214, in which an aqueous solution is provided. In step 216, the APC by-products are washed with the aqueous solution.

As a particular practical example, an applied practice is to wash APC by-products with an aqueous solution such as water or condensate. The weight ratio of aqueous solution to APC by-products is generally from about 2 up to 10. This usually results in a saline effluent with a salt concentration of about 4% dissolved salts by weight. Since water-soluble chloride salts is to be recovered form APC by-products, the water in APCBP leach-solution has typically to be removed by evaporation. Therefore, the concentration of salts in the APCBP leach-solution is of outmost importance for the costs for water evaporation. In general, a higher salt concentration will require less evaporation of water per unit salt produced and thus lower operational costs.

It is, in particular embodiments, possible to increase the salt concentration of APCBP leach-solution by applying membrane based technologies such as reverse osmosis, electro-dialysis reversal, etc. However, APCBP leach-solution is generally high in alkalinity (pH of ca 11-12) and supersaturated with a range of inorganic salts such as gypsum, and various hydroxides which have a very high tendency to foul membranes. Therefore, application of membrane technology to concentrate APCBP leach-solution is usually costly or difficult to operate due to operational problems caused by fouling of membranes, usually by inorganic scale.

Therefore, in a preferred embodiment, the difficulties of using membrane technology for concentration of APCBP leach-solution is avoided by obtaining a high salt concentration already in the process of washing of APC by-products. Such an approach requires a refined washing operation to obtain a high salt concentration in the APCBP leach-solution and at the same time to obtain a washed residue which fulfils the criteria of low chloride content for disposal.

In one such embodiment, it was found that the kinetics of chloride release from APC by-products is rapid, resulting in almost complete chloride release within between about one minute to a few minutes. It was also found that it is possible to increase the chloride concentration in the APCBP leach-solution by reusing the leach-solution in a subsequent wash cycle. A concept was thereafter developed for a washing procedure that can enable to obtain a highly saline solution already during the washing process and at the same time to fulfil the disposal criteria for the residue.

Figure 7:
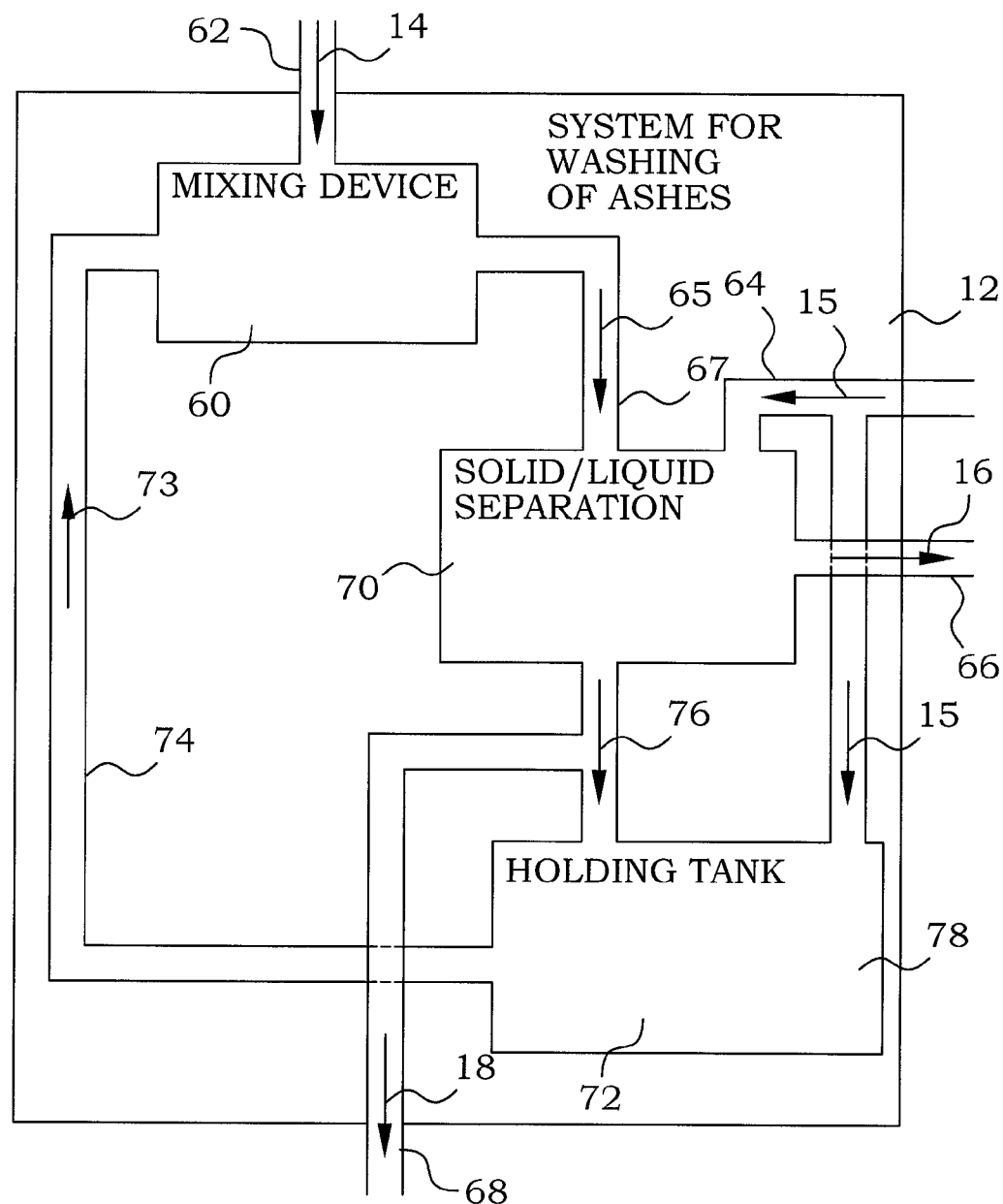
FIG. 7 is a schematic illustration of an embodiment of a system for washing of APC by-products (APCBP)

APC by-products contain typically about 20 percent by weight of soluble chloride salts. This means that in order to obtain a salt solution with a concentration of above about 17% salts by weight, the liquid to solid weight ratio during washing should be below 1. One embodiment of a concept for washing APC by-products is shown in FIG. 7. A system for washing of ashes 12 or generally washing of APC by-products is intended to be comprised in the input section 10 (FIG. 5). The system for washing of ashes 12 comprises an ash inlet 62 for providing of fly ashes 14 or generally APC by-products, and a water inlet 64 for providing of rinse water 15. The system for washing of ashes 12 further comprises an ash outlet 66 for exiting washed ashes 16 or generally washed APC by-products and an aqueous solution outlet 68 for exiting an initial aqueous solution. Fly ashes 14, i.e. APC by-products are mixed with recycled leach solution 73 (as will be described further below) at a liquid/solid ratio of from 1 up to above 20, preferably between about 2 to 4. Mixing of the APC by-products, i.e. the fly ashes 14, and recycled leach-solution 73 can be performed in any suitable mixing device 60 such as continuous stirred tank reactor (CSTR), inline static mixer, etc. Of course, a number of subsequent mixing devices can be coupled in series. A slurry 65 is thereby produced. After mixing, the slurry 65 is fed through a pipe 67 into a solid/liquid separation device 70. Any suitable solid/liquid separation device 70 can be used such as vacuum belt filter, filter press, drum filter, disk filter, etc. Alternatively the APC by-products/leach solution mixing device 60 can be omitted and washing of APC by-products can entirely take place directly in the solid/liquid separation device 70.

After filtration, the APC by-products are rinsed with rinse water 15 from the water inlet 64. The rinse water for rinsing can be of different origins, such as recycled condensate water, landfill leachate water, tap water, etc. The amount of rinse water is preferably below 2 liter water per kg of APC by-products. Rinsing can be performed in a single step or in several subsequent steps. It is also possible to improve the rinsing operation by rinsing in a counter-current manner. Washed ashes 16 or APC by-products are removed and exited through the APC by-product outlet 66.

A concentrate filtrate 76 is produced. A first part of the concentrated filtrate 76 is recovered as a salt solution for further processing to recover its salt content, i.e. the initial aqueous solution. A second part of the concentrated filtrate 76 is diluted with the rinse water 15. The diluted filtrate 78 is typically stored temporarily in a holding tank 72. The diluted filtrate 78 is recycled as recycled leach solution 73 by a recycling pipe 74 to the mixing device 60, for washing the incoming APC by-products 14.

Figure 8:
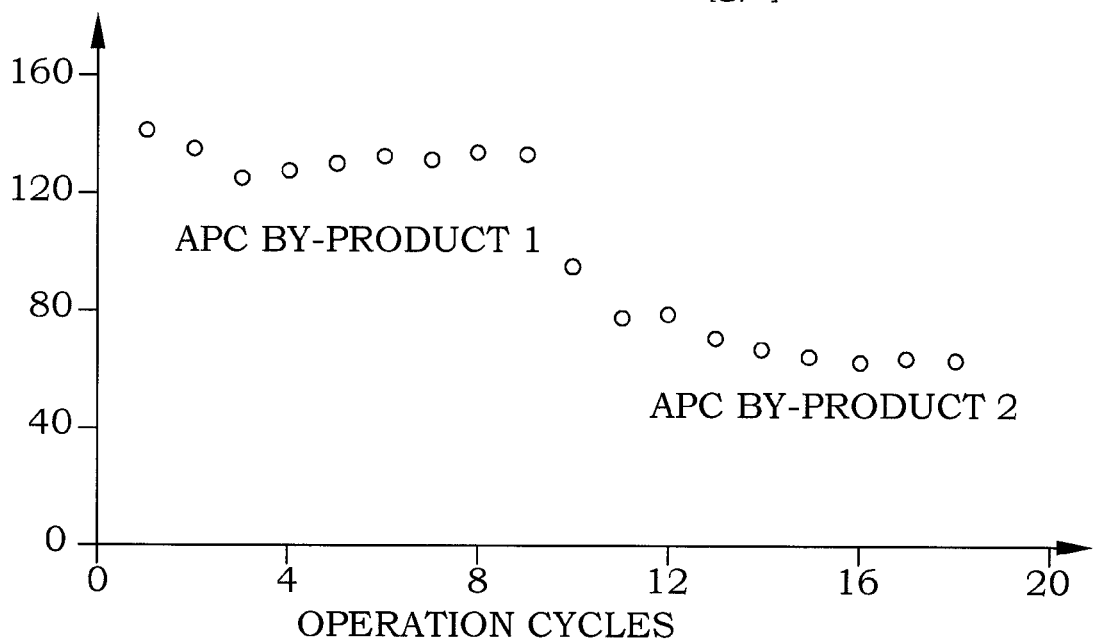
FIG. 8 is a graphic illustration of results from steady state operation of washing APC by-products.

FIG. 8 shows experimental results from steady state operation of washing two different types of APC by-products. Data were experimentally obtained by mixing APC by-products with recycled process solution at liquid/solid ratio of 4 and rinsing performed at liquid to solid ratio of 1.8 in relation to non-washed APC by-products. APC by-product 1 had a chloride content of about 19% by weight which resulted in an APCBP leach-solution containing about 130 000 mg Cl per liter or about 26% salts by weight. By shifting to APC by-product 2, which contained only ca 8% Cl by weight, the salt concentration in the APCBP leach-solution was found to stabilize at about 60 000 mg Cl per liter or about 12% dissolved chloride salts by weight.

Figure 9:
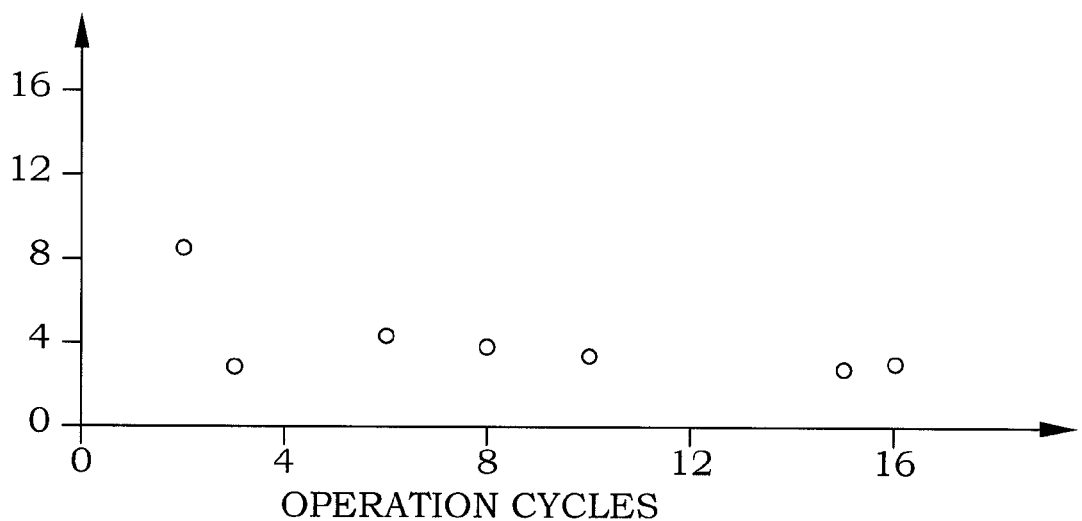
FIG. 9 is a graphic illustration of results from leaching tests performed on washed APC by-products after steady state operation trails.

FIG. 9 shows the experimental results of leaching tests performed on washed APC by-products from the steady state operation. From the results it can be seen that the chloride content in the washed residue fulfils the criteria for disposal as non-hazardous waste in Sweden (<15 000 mg Cl per kg dry matter). Thus, the experiments showed that it is perfectly possible to produce a concentrated salt solution (FIG. 8) suitable for cost effective processing by e.g. evaporation techniques and at the same time to fulfil the criteria for disposal of the washed fly ash as non-hazardous waste (FIG. 9).

In other words, in a particular embodiment, the arrangement for recovery of salt comprises an input section in turn comprising a system for washing of ashes 12 (FIG. 7), e.g. a fly ash washing arrangement.

Even though the above washing procedure is exemplified using fresh water as a washing medium it should be clear that any other washing procedures are possible. For example, APC by-products can be washed with an acid solution to dissolve different metallic components such as zinc or phosphorus if present. Recovery of chloride salts according to the present invention can therefore by advantage be combined with other recovery processes such as zinc recovery by precipitation/extraction, phosphorus recovery by precipitation/extraction, recovery of precious metals by selective adsorbents, etc.

APCBP leach-solution is primarily composed of a mixture of water-soluble chloride salts such as calcium chloride, sodium chloride and potassium chloride. If water is used as the washing medium, the pH of the wash water is typically high above pH 11.5. A generally high pH level combined with usually a high content of dissolved calcium results generally in low content of carbonates, fluorides and silicates as these anions form water-insoluble precipitates such as calcium carbonate, calcium fluoride and calcium silicate having very low solubility at high pH level. The content of dissolved iron is usually low as ferrous and ferric iron form insoluble iron hydroxides at high pH level. The nitrate content is generally low in APC by-products. It was also found that dioxins are essentially not released into solution and are incorporated in the washed APC by-products residue in a non-leachable form suitable for disposal in a landfill.

However, APCBP leach-solution can contain a range of impurities such as suspended solids (inorganic or organic) and dissolved compounds such as sulfates, ammonia, ammonia-metal complexes, hydroxides (e.g. $Ca(OH)_2$, KOH, NaOH), heavy metals (e.g. Cd, Ni, Zn, As, Pb, Cr in form of dissolved cations, dissolved anions, oxyanions or ammonia complex), amphoteric metals such as aluminium forming dissolved hydroxy-anion at high pH, etc. Thus, in a preferred embodiment, APCBP leach-solution is pre-treated for removal of non-wanted substances, preferably before recovery of soluble chloride salts.

Figure 10:
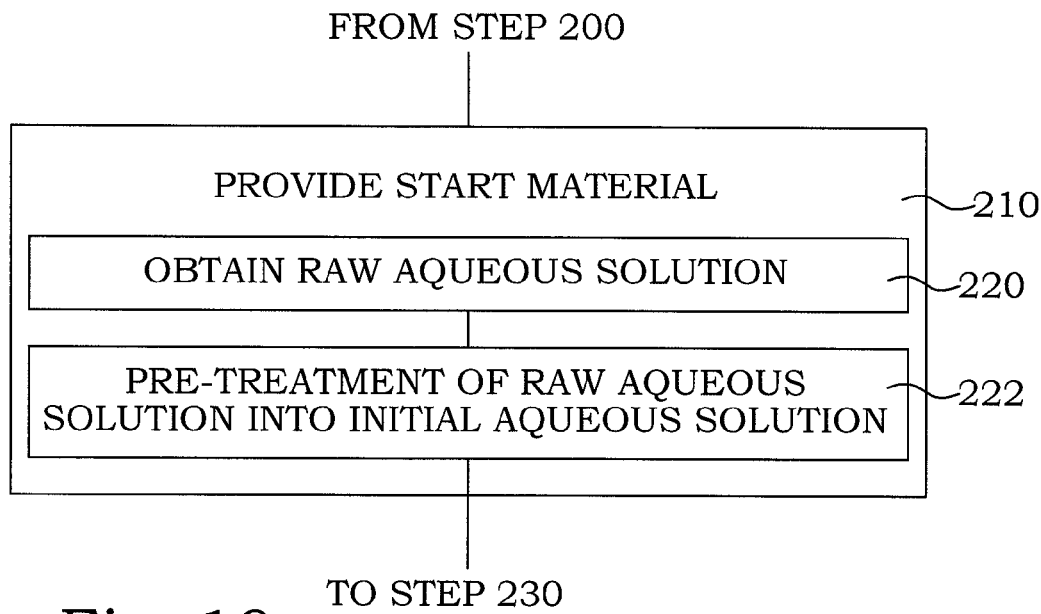
FIG. 10 is a flow diagram of part steps of another embodiment of a step of providing initial aqueous solution of ions.

In FIG. 10, an embodiment of part steps of an embodiment of the step of providing 210 a start material, e.g. in FIG. 4 is illustrated. In step 220, a raw aqueous solution comprising ions of Na, K, Cl and optionally Ca is obtained. This can in particular embodiments comprise the steps 212, 214 and 216 of FIG. 6. In other particular embodiments, the raw aqueous solution can be provided by other processes, e.g. as described further above. In step 222, the raw aqueous solution is pre-treated into the initial aqueous solution. This is performed by at least one of removal of sulfate, removal of ammonia, removal of heavy metals and neutralization.

In an analogous embodiment of an arrangement for salt recovery, as illustrated by some dashed parts in FIG. 5, the input section 10 comprises a supply 21 of a raw aqueous solution comprising ions of Na, K, Cl and optionally Ca. This can in particular embodiments comprise the system for washing of ashes 12 (of FIG. 7). In other particular embodiments, the raw aqueous solution can be provided by other processes, e.g. as described further above. The input section 10 further comprises a pre-treating arrangement 22, connected to the supply 21 of the raw aqueous solution. The pre-treating arrangement 22 is arranged for pre-treating the raw aqueous solution into the initial water solution. This pre-treating is performed by at least one of a sulfate removal arrangement, an ammonia removal arrangement, a heavy metal removal arrangement and a neutralization arrangement.

Pretreatment of the APCBP leach-solution can be done by any treatment technology to separate non-wanted substances from a saline solution. In general, a preferred pretreatment is to add suitable chemicals to the APCBP leach-solution to induce precipitation of the impurities followed by a solid/liquid separation. Suspended solids (inorganic and/or organic) can usually be removed by flocculation and sedimentation. However, other possibilities also exist such as floatation, filtration, etc. Dissolved organic carbon is generally low. If present, it can be removed by adsorption on e.g. activated carbon, oxidation by addition of hydrogen peroxide, etc.

Dissolved sulfate can generally be removed by precipitation in form of calcium sulfate di-hydrate (gypsum) by adjusting the ratio of Ca to S in the APCBP leach-solution to form an excess of Ca over S.

In most cases, the calcium concentration in APCBP leach-solution is higher than the sulfate content and no adjustment has to be made. In case the APCBP leach-solution has a high soluble sulfate content in relation to dissolved calcium, the calcium content can be increased by mixing a water-soluble Ca containing APC by-product during the washing, addition of APCBP leach-solution with a high dissolved Ca content, addition of $CaCl_2$, recycling of a part of recovered $CaCl_2$, etc. In general, gypsum precipitation enables to reduce sulfate concentration to ca 1500 mg/l (ca 500 mg S per liter). In many cases, the APCBP leach-solution is supersaturated regarding dissolved gypsum and the only treatment required is to break the super-saturation i.e. induce precipitation. Examples for such treatment include aging of the APCBP leach-solution, agitation, aeration, seeding with crystals, quiet settling, etc.

If the dissolved sulfate content has to be further reduced it is possible to further reduce sulfate concentration by precipitating sulfate in form of ettringite $Ca_6Al_2(SO_4)_3(OH)_{12}.26H_2O$ which has a lower solubility compared to gypsum. Ettringite can be precipitated by adding an aluminium source such as alum to the APCBP leach-solution. Ettringite precipitation can reduce the sulfate content to <200 mg per liter (<66 mg S per liter). Of course, any other method for separation of dissolved sulfate is possible such as precipitation with barium salts such as $BaCl_2$, $BCO_3$, BaS, or $Ba(OH)_2$, etc.

In other words, in one embodiment of the method for salt recovery, the removal of sulfate is performed by at least one of gypsum precipitation by addition of Ca ions, ettringite precipitation by addition of Al ions; and barium sulfate precipitation by addition of Ba ions.

Analogously, in one embodiment of an arrangement for salt recovery, the sulfate removal arrangement comprises a sulfate removal ion adding arrangement and a sulfate removal separator. The sulfate removal ion adding arrangement is arranged for adding at least one of Ca ions, Al ions and Ba ions to cause precipitation of gypsum, ettringite, and barium sulfate, respectively. The sulfate removal separator is arranged to separate any precipitation of gypsum, ettringite, and barium sulfate.

APCBP leach-solution usually contains also a range of dissolved metals and heavy metals. Several techniques can be used for separation of metals such as adjustment of pH to induce the precipitation of metals as hydroxides. If the pH is too low it can be increased by addition of a base and if the pH is too high it can be decreased by addition of an acid. Of course, a combination of both pH increase and pH decrease and vice versa with accompanying solid/liquid separation can be performed. Different metal hydroxides can have minimum solubility at different pH level. The adjustment of the pH may, as will be discussed more in detail below, also be necessary for other reasons.

An effective way of removing heavy metals from APCBP leach-solution is to precipitate heavy metals as sulfides. Metal sulfides have a very low solubility at high pH levels from neutral to alkaline which means that precipitation of heavy metals can be done by addition of inorganic salts of sulfides to the APCBP leach-solution with or without pH adjustment. Examples of inorganic sulfides include sodium sulfide, hydrogen sulfide, calcium sulfide, iron sulfide, etc. Of course, other forms of sulfides such as e.g. 1,3,5-triazine-2,4,6-triathione sodium salt known as TMT 15 can be used as well as other organic forms of sulfides. Table 2 shows some experimental results of heavy metal removal from APCBP leach-solution by addition of inorganic sodium sulfide without any pH adjustment.

TABLE 2

Removal of dissolved heavy metals from APCBP leach-solution by addition of sodium sulphide without any pH adjustment.

| | As mg/l | Pb mg/l | Cd mg/l | Cu mg/l | Cr mg/l | Ni mg/l | Zn mg/l |
|---|---|---|---|---|---|---|---|
| Before sulphide precipitation | 0.0016 | 220 | 0.00014 | 0.56 | 0.33 | 0.0016 | 11 |
| After sulphide precipitation | 0.0014 | 0.00081 | <0.0001 | 0.001 | 0.0023 | 0.0013 | <0.005 |

It is usually common to combine sulfide precipitation with a flocculation operation to enhance solid/liquid separation by e.g. sedimentation. Common inorganic chemical additives to induce flocculation include ferric chloride, ferrous chloride, aluminium chloride, ferric hydroxide, ferrous hydroxide, aluminium hydroxide, magnesium chloride, magnesium hydroxide, calcium carbonate, etc. In addition to inorganic compounds, polymers (non-ionic, anionic, or cationic) are also commonly used for flocculation with/or without sulfide precipitation.

Heavy metals can also be removed from APCBP leach-solution by precipitation in form of phosphates. For that purpose, a phosphorus source such as phosphoric acid, mono-calcium phosphate, ammonium phosphate, potassium phosphate, etc. can be added to the APCBP leach-solution to cause precipitation of heavy metals as phosphates. The solubility of metal phosphates is generally much lower than that of calcium phosphate which enables to precipitate heavy metals as phosphates even in the presence of high concentrations of dissolved calcium. Of course, precipitation of heavy metal phosphates can be combined with flocculation operation as described before and with other heavy metal precipitation agents as described previously.

In addition to precipitation techniques, heavy metals can be removed from APCBP leach-solution by processes based on chemical reduction. Examples include addition of zinc, aluminium, etc. in elemental form as a reducing agent to precipitate heavy metals in elemental form.

Another possibility for heavy metal separation from APCBP leach-solution is to remove heavy metals by use of a material that can adsorb the heavy metals. Suitable materials include various chelating resins, such as e.g. resinex CH-80, containing thiol groups that enable to adsorb heavy metals even in the presence of high concentration of calcium in solution.

In other words, in one embodiment of a method for salt recovery, the removal of heavy metals is performed by at least one of sulfide precipitation by addition of S ions, hydroxide precipitation by addition of hydroxide ions, hydronium ions and/or an acid and phosphate precipitation by addition of phosphate ions. In a particular embodiment, the removal of heavy metals further comprises flocculation by hydroxide ions of Fe, Al, and/or Mg and/or by polymers. In a particular embodiment, the removal of heavy metals comprises adsorption in chelating resins.

Analogously, in one embodiment of an arrangement for salt recovery, the heavy metals removal arrangement comprises a heavy metals removal ion adding arrangement and a heavy metals removal separator. The heavy metals removal ion adding arrangement is arranged for adding at least one of S ions, hydroxide ions, hydronium ions and/or an acid and phosphate ions to cause precipitation of sulfide, hydroxide, and phosphate, respectively, of heavy metals. The heavy metals removal separator is arranged to separate any precipitation of sulfide, hydroxide, and phosphate of heavy metals. In a particular embodiment, the heavy metals removal arrangement further comprises means for removal of heavy metals by flocculation by hydroxide ions of Fe, Al, and/or Mg and/or by polymers. In a particular embodiment, the heavy metals removal arrangement comprises means for adsorption of heavy metals in chelating resins.

Figure 11:
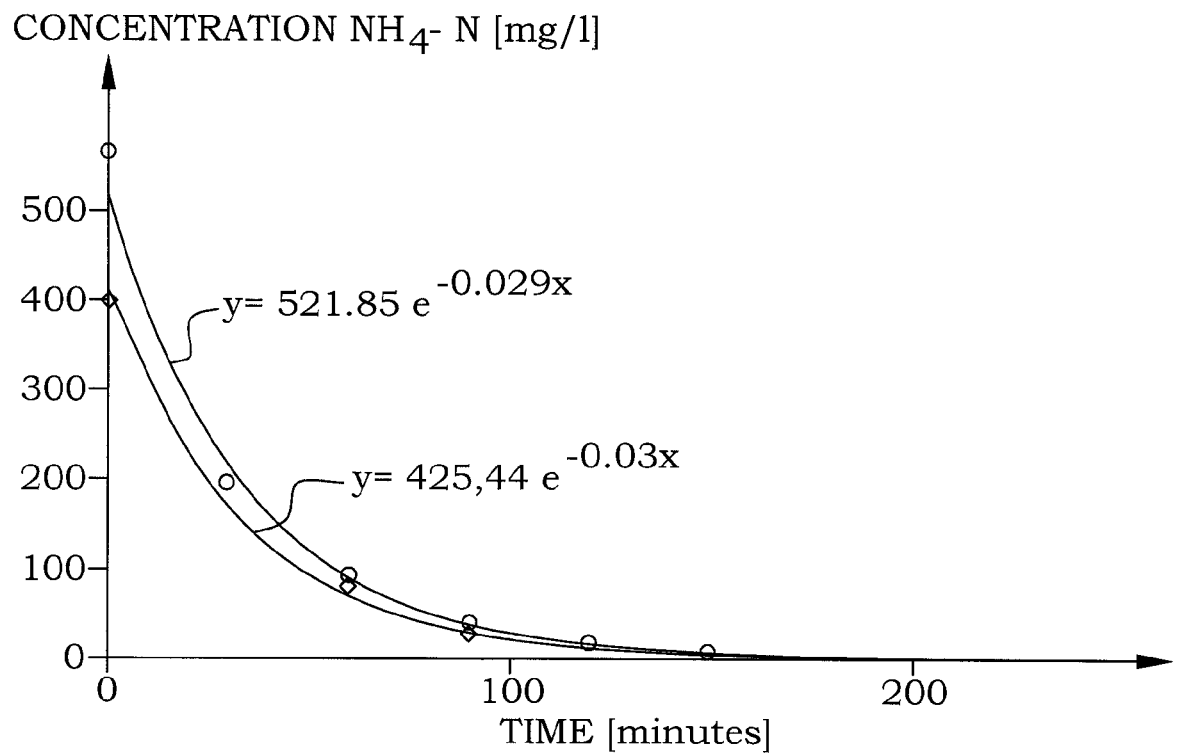
FIG. 11 is a graphic illustration of reduction of ammonia content in APCBP leach-solution by stripping during agitation.

An additional impurity which may be present in APCBP leach-solution is nitrogen usually in form of ammonia at high pH level. Ammonia can be present in dissolved form or in form of metal complexes. It was found that ammonia could be removed from the APCBP leach-solution by agitation as shown in FIG. 11. Ammonia metal complexes are usually broken by sulfide precipitation. Additional methods for breaking metal complexes include addition of $H_2O_2$ with or without combination with UV light, etc.

Ammonia can also be removed from APC by-products before the washing operation. In this alternative the APC by-products are moisten and aged to release its ammonia content before the washing operation. Another alternative is to remove ammonia from the APCBP leach-solution by stripping in conventional ammonia stripping columns using e.g. air or steam as stripping medium. Another possibility for removal of ammonia is at a later stage of the treatment processes during water evaporation. Ammonia gas can be removed together with water vapors and be separated from the water during the condensation of the water vapors. Removed ammonia can usually be recovered in a useful form such as aqueous/liquid ammonia or an ammonium salt solution such as ammonium sulfate which can be used as a fertilizer.

In other words, in one embodiment of a method for salt recovery, the removal of ammonia is performed by stripping by air or steam.

Analogously, in one embodiment of an arrangement for salt recovery, the ammonia removal arrangement comprises a stripping arrangement by air or steam.

In summary, there are various ways to remove non-wanted substances from APCBP leach-solution. Removal of impurities in a pretreatment step prior to salt recovery is generally preferred. However, impurities can also be removed at a later stage of the treatment by applying the same principal techniques. An additional alternative is not to remove impurities in pretreatment but to let the impurities end up in the recovered water-soluble salt. Thereafter, the recovered water-soluble salt can be recrystallized and in that way impurities may be separated.

If impurities such as gypsum, metal sulfides, precipitated calcium carbonate, etc. are removed in a pretreatment by addition of suitable chemicals followed by settling, the sediment can be pumped back to the APC by-products washing operation. In that way, separate removal of impurities is not required and the impurities can be incorporated in the washed APC by-products in a non-leachable form suitable for disposal in a landfill.

After the pretreatment, a concentrated brine of the desired quality can be formed suitable for subsequent salt recovery operation.

Figure 12:
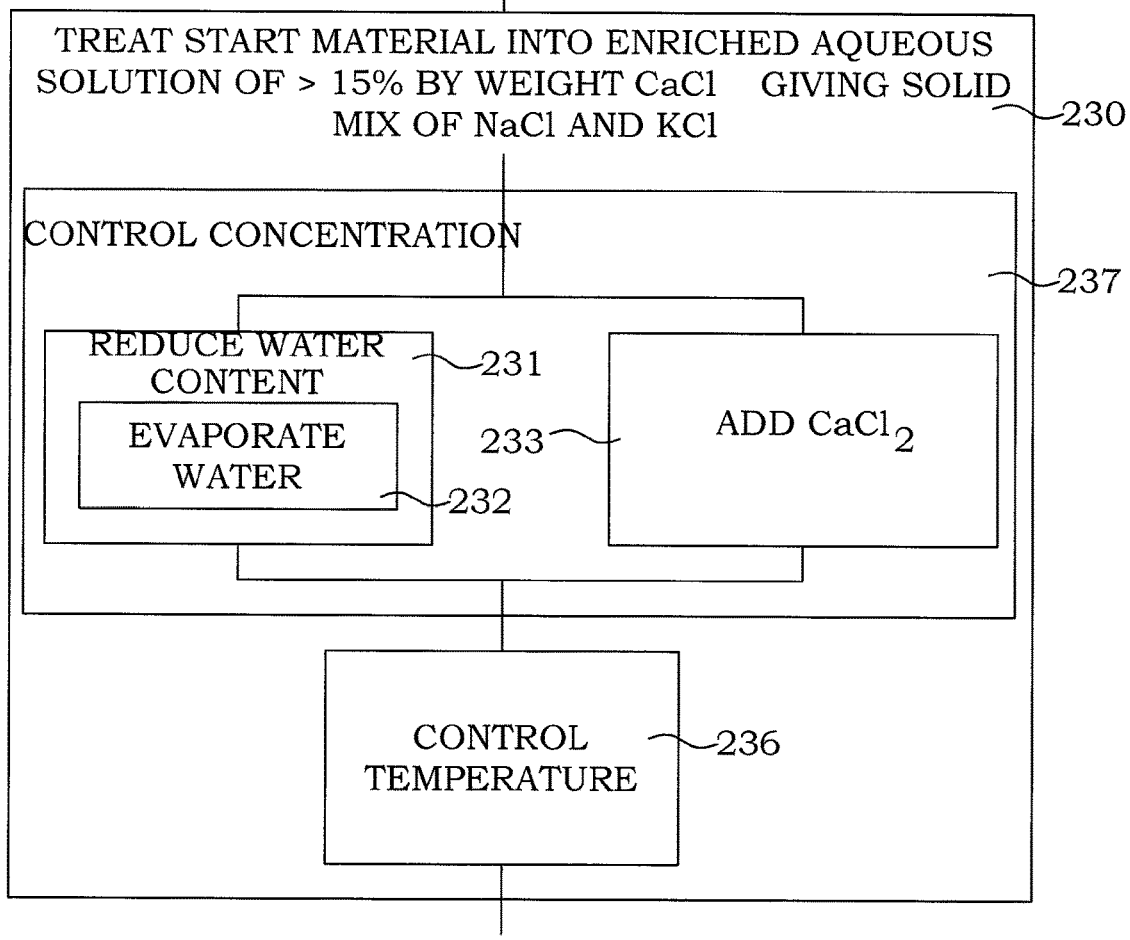
FIG. 12 is a flow diagram of part steps of an embodiment of a step of treating a start material.

FIG. 12 is a flow diagram of part steps of an embodiment of step 230 of FIG. 4. The step 230, in which the start material is treated into an enriched aqueous solution, comprises the step 231, in which the water content is reduced, and/or the step 233, in which $CaCl_2$ is added. In a particular embodiment, the reduction of water content 231 comprises evaporation of water 232. These steps aim to provide a solution with a high and well-defined concentration of $CaCl_2$. In a preferred embodiment, the step 230 of treating the start material comprises concentrating the initial aqueous solution into an enriched aqueous solution having a concentration of $CaCl_2$ of at least 35% by weight. In a preferred embodiment, the step 230 of treating the start material comprises concentrating the initial aqueous solution into an enriched aqueous solution having a concentration of $CaCl_2$ of at most 44% by weight.

As was also concluded from the experiments on the Ca—Na—K—Cl system, a high salting-out effect, i.e. a high purity of the remaining $CaCl_2$ in the solution, was obtained close to the solubility limit for each temperature. In one embodiment, it is preferred to control the enriched aqueous solution to keep the $CaCl_2$ in the solution, but still be near the solubility limit. This can be achieved by controlling the temperature and/or the concentration. Therefore, in one embodiment, the step 230 of treating the start material comprises the step 236, in which a temperature of the enriched aqueous solution is controlled, and/or the step 237, in which the concentration of $CaCl_2$ is controlled. The step 236, comprises controlling of a temperature of the enriched aqueous solution to exceed a solubility temperature for the concentration of $CaCl_2$. In a preferred embodiment, the temperature of the enriched aqueous solution is controlled to be within 20° C., more preferably within 10° C., and most preferably within 5° C. from a solubility temperature for the prevailing concentration of $CaCl_2$. The step 237 comprises controlling of the concentration of $CaCl_2$ to be lower than a solubility concentration for a prevailing temperature of the enriched aqueous solution.

Figure 13:
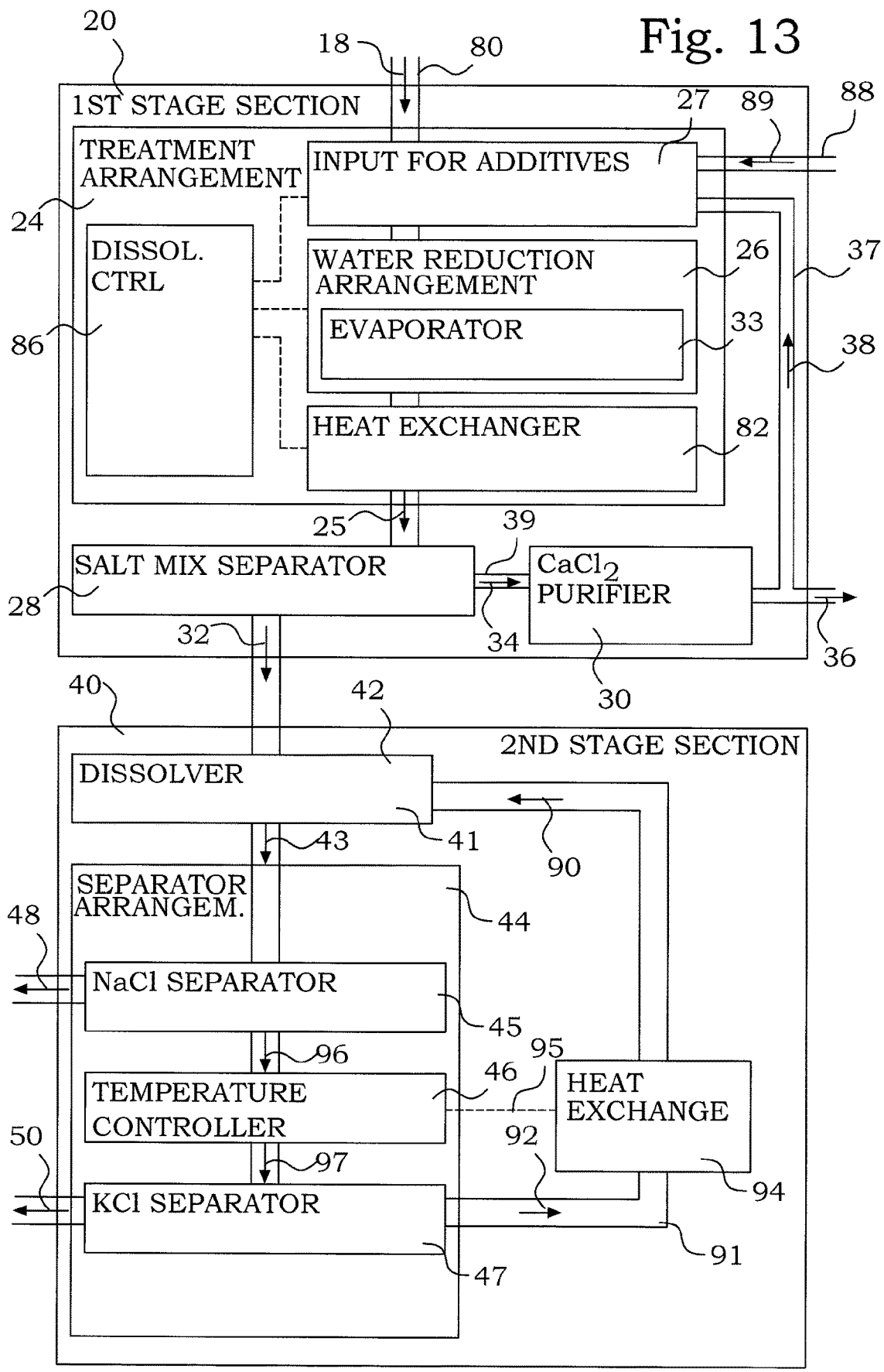
FIG. 13 is a block diagram of parts of an embodiment of first and second stage sections of an arrangement for recovery of salts.

FIG. 13 is a schematic illustration of an embodiment of a first stage section 20 of an arrangement for recovery of salts. After pre-treatment, if any, the start material 18 is provided to the treatment arrangement 24 of the first stage section 20 through a start material inlet 80. The ionic composition of the initial aqueous solution, e.g. the APCBP leach-solution, is in this embodiment controlled to obtain an excess of calcium chloride in relation to sodium chloride and potassium chloride, to provide the enriched aqueous solution 25. The desired excess of calcium chloride over alkali salts is calculated in such manner that after concentration by e.g. removing water, the weight of precipitated alkali salts will preferably be lower than the weight of produced concentrated calcium chloride solution to enable easy pumping. The treatment of the initial aqueous solution is performed in the input for additives 27 and in the water reduction arrangement 26. Preferably, the water reduction arrangement 26 comprises an evaporator 33. Preferably, the weight of crystallized alkali salts is set to be less than 25 percent of the weight of concentrated calcium chloride solution.

In cases in which the APCBP leach-solution is composed of mainly sodium chloride and/or potassium chloride with only a minor content of calcium chloride, the APCBP leach-solution is preferably mixed with a recycled calcium chloride solution 38, obtained from a later described depleted aqueous solution 34, to obtain the desired excess of calcium chloride. Addition of calcium chloride can thus be performed by using recycled $CaCl_2$ solution from later in the process. However, other, external $CaCl_2$ sources 89, may also be added through an additive inlet 88. It should be emphasized that mixing of a recycled calcium chloride solution, i.e. the depleted aqueous solution 38, or external sources of $CaCl_2$ can take place before entering the water reduction arrangement 26, or after the water reduction arrangement 26 as indicated by dotted lines in FIG. 13. In other words, the order of the water reduction arrangement 26 and the input for additives 27 may be switched, or the water reduction arrangement 26 and the input for additives 27 may be integrated into one and the same unit.

A preferred way of performing water reduction in the water reduction arrangement 26 and in particular evaporation in the evaporator 33 is to operate under vacuum at temperatures below 80° C., since such vacuum evaporation systems are generally cost effective. However, it should be clear than any evaporation technology can be used, e.g. operating without vacuum, at higher temperatures.

After evaporation, with or without addition of a calcium chloride source, the solution is concentrated to obtain a calcium chloride concentration of more than 15% by weight, preferably more than 30% by weight and more preferably more than 35% by weight. In other words, in one preferred embodiment, the treatment arrangement 24 is arranged for concentrating the initial aqueous solution into an enriched aqueous solution having a concentration of $CaCl_2$ of at least 35% by weight. Concentrating of the initial aqueous solution is also connected to consumption of energy or other resources. An unnecessary concentrated solution may therefore not be the most cost efficient solution. Therefore, in one preferred embodiment, the treatment arrangement 24 is arranged for concentrating the initial aqueous solution into an enriched aqueous solution having a concentration of $CaCl_2$ of at most 44% by weight.

In the embodiment illustrated in FIG. 13, the content of $CaCl_2$ is intended to be kept within the solution. At the same time, the highest purity of the $CaCl_2$ solution, i.e. the efficiency of the salting out is highest close to the solubility limit of $CaCl_2$. Therefore, in one embodiment, the treatment arrangement 24 comprises a dissolution control 86. The dissolution control is arranged for at least one of controlling a temperature of the enriched aqueous solution 25 to exceed a solubility temperature for the concentration of $CaCl_2$, and controlling the concentration of $CaCl_2$ to be lower than a solubility concentration for a prevailing temperature of the enriched aqueous solution 25. The first control action is performed by controlling the operation of the input for additives 27 and/or the water reduction arrangement 26. The control of the extent of water removal, e.g. evaporation, and/or mixing with $CaCl_2$ can be done according to online analysis of the calcium content in the feed APCBP leach-solution, i.e. the start material 18. Of course, any indirect measurement can be done for that purpose such as measuring conductivity, density, viscosity, pH, refractive index, etc. Such measurements are, as such, known in prior art and the person skilled in the art is well acquainted to such performances. Therefore, such analysis or monitoring is not further discussed.

The second control action is performed by controlling a heat exchanger 82 to which the enriched aqueous solution 25 is fed, preferably after the water reduction arrangement 26 and the input for additives 27. The concentrated calcium chloride solution, i.e. the enriched aqueous solution 25, is preferably cooled by the heat exchanger 82 to a temperature preferably lower than 30° C., more preferably lower than 20° C. It should, however, be emphasized that as can be seen from table 1 a wide range of temperatures and concentrations are possible in order to obtain a relatively pure calcium chloride solution by crystallizing a mixture of sodium chloride and potassium chloride by a "salting out" mechanism. One approach is to keep the temperature/concentration conditions close to the saturation limit. Therefore, in one embodiment, the dissolution control 86 is arranged for keeping a temperature of the enriched aqueous solution to be within 20° C., preferably within 10° C., and most preferably within 5° C. from a solubility temperature for the concentration of $CaCl_2$.

Figure 14:
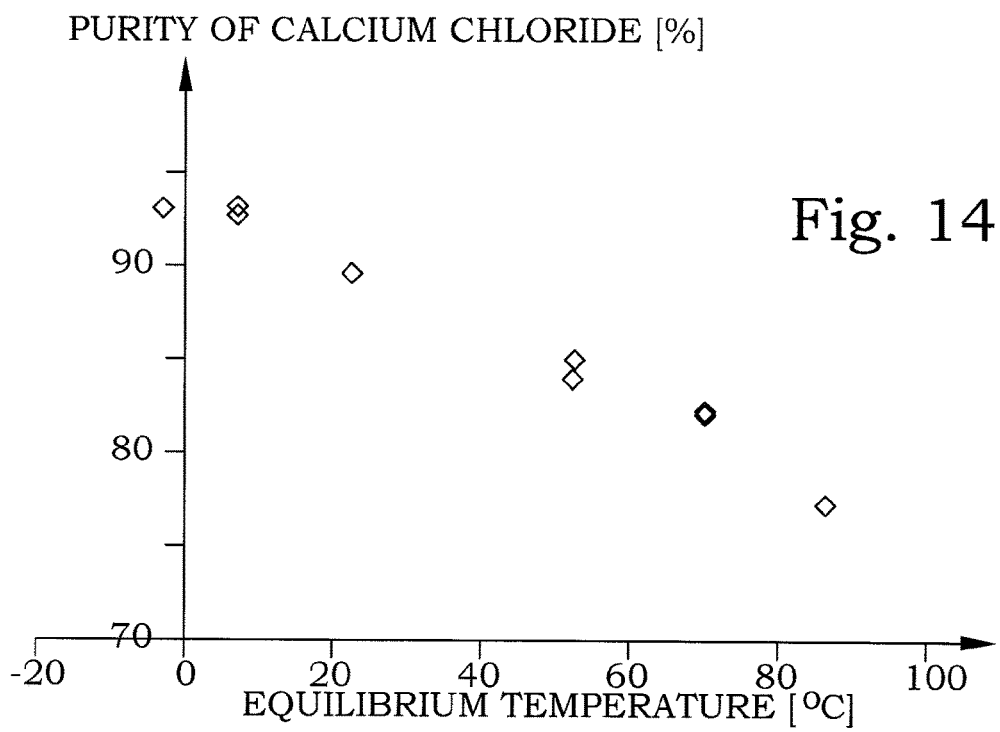
FIG. 14 is a diagram illustrating purity of calcium chloride solution of about 35% by weight dependent on temperature.

FIG. 14 shows the purity of calcium chloride obtained by concentrating APCBP leach-solution to 35 percent calcium chloride by weight and performing solid/liquid separation in different temperatures. From the figure it is clear that at a set calcium chloride concentration, the purity of calcium chloride solution is higher when solid/liquid separation is performed at lower temperatures. For an APCBP leach-solution having 35% calcium chloride by weight, a calcium chloride purity of over 90% could be reached by cooling to a temperature of below about 19° C. Of course, a higher concentration of calcium chloride results in a higher purity at the same temperature.

Returning to FIG. 13, after cooling in the heat exchanger 82 of the APCBP leach-solution, i.e. the enriched aqueous solution 25, to the desired temperature, a mixture of sodium chloride and potassium chloride is crystallized out of solution, forming a solid mix 32 of NaCl and KCl. The solid mix 32 of NaCl and KCl salts is thereafter separated in a salt mix separator 28 from the concentrated $CaCl_2$ solution, i.e. the depleted aqueous solution 34, by solid/liquid separation. Any suitable solid/liquid separation technique can be used such as centrifuge, vacuum belt filter, filter press, disc filter, drum filter, etc. Such methods are, as such, well known in prior art and are not further discussed.

The obtained calcium chloride solution, i.e. the depleted aqueous solution 34, has a concentration of preferably over 36 percent by weight and a purity of 90-94%. The rest of the solvated substances being residual sodium chloride and potassium chloride. The obtained calcium chloride solution can be directly used without further treatment in applications such as de-icing, dust control, etc. As mentioned further above, the calcium chloride solution can also be used for increasing the content of Ca ions in the treatment of the start material. In other words, one embodiment of the method comprises the further step of: recycling at least a part of the depleted aqueous solution to be used as additives of Ca ions and Cl ions in a further treating of the start material into an enriched aqueous solution. A corresponding arrangement further comprises a partial return arrangement 37 connecting an output 39 from the salt mix separator 28, possibly via the below described $CaCl_2$ purifier 30, and an input to the treatment arrangement 24 of the first stage section 20. The partial return arrangement 37 is thereby arranged for recycling at least a part of the depleted aqueous solution 34, i.e. a recycled calcium chloride solution 38, to be used as additive of Ca ions and Cl ions in the treatment arrangement 24.

The obtained calcium chloride solution, i.e. the depleted aqueous solution 34, can also be further treated in a $CaCl_2$ purifier 30 to increase its purity as will be discussed later. In other words, one embodiment of the method comprises the further step of purifying the depleted aqueous solution 34 from residual alkali salts. A corresponding embodiment of an arrangement further comprises a $CaCl_2$ purifier 30 connected to an output from the salt mix separator 28. The $CaCl_2$ purifier 30 is arranged for purifying the depleted aqueous solution from residual alkali salts.

A solution of $CaCl_2$ 36 is output from the first stage section 20.

Control of the ionic composition of the initial aqueous solution, e.g. the APCBP leach solution in the present invention comprises modification of the original ionic composition of NaCl and KCl to $CaCl_2$ obtained by contacting the start material with water. The modification of the ionic composition of the above described initial aqueous solution is controlled in a way that during the separation of the solid mix of NaCl and KCl from dissolved $CaCl_2$, the weighed of the solid mix of NaCl and KCl is preferably lower than the weight of produced $CaCl_2$ solution in order to enable technical separation of the solid salt mixture from the solution. In general, this would mean to form a slurry which can technically be transported into a solid liquid separation device.

Modifying of the weight ratio may comprise controlled provision of at least additional ions of Ca to modify the original ionic composition obtained by reacting the start material with water. Provision of at least additional ions of Ca can be performed by several means. Addition of calcium chloride from later in the process has been discussed here above.

An additional alternative for provision of Ca ions can be addition of an acid to the start material in order to dissolve non-water soluble calcium containing compounds. In such a way additional calcium ions are provided over dissolved calcium ions obtained by only contacting the start material with water.

Provision of additional calcium ions over the original ionic composition of the solution obtained by contacting the start material with water can be done as stated before by recycling calcium chloride from a later step in the process. Solid liquid separation of the salt mixture from the solution preferably requires that a sufficient amount of calcium chloride solution is present with regards to the amount of solid salt mixture to enable the separation to be technically feasible. However, an alternative to separate in a technically feasible manner a mixture composed of relatively little calcium chloride solution in relation to a larger amount of solid salt mixture is to perform the separation in several steps.

One such example is to separate the solid mixture of salts from liquid calcium chloride in for example two subsequent steps. The first separation step is carried out in a higher temperature than the second separation step. At a higher temperature the solubility of the salt mixture in calcium chloride is higher which means that the amount of solid salt mixture to liquid calcium chloride is lower which can enable an easy technical separation of the solids from the liquid. After the first separation of the solids, the solution can be further cooled to a lower temperature thus enabling the precipitation of additional solid mixture of salts. However, since a first part of the solids has been already removed, the amount of solid salt mixture to liquid calcium chloride is now lower than the original ratio of solids to liquids compared to if the salt separation would have been done in a single step at the lower temperature.

A practical application of this approach can be to recycle a solution having calcium chloride as a main component through an evaporation chamber operated at ca 80° C. To continuously remove the precipitated mixture of salts at a first temperature of between 80° C. and 40° C., thereafter to recycle the calcium chloride containing filtrate back to be mixed with the feed solution entering the evaporation chamber. Separation of solids at the first temperature can be done by any suitable solid liquid separation technique such as filtration, centrifugation, cyclonic separation, etc.

In this example, a first part of the filtrate is recycled back to be mixed with the feed solution entering the evaporation chamber and a second part of the filtrate is cooled to a second temperature of between 40° C. to 0° C. preferably about 15° C. which results in the precipitation of a second part of the salt mixture which is removed from the solution with a suitable solid liquid separation device. The two parts of the separated salt mixtures in the two subsequent steps are thereafter mixed together to be treated for the separation of NaCl and KCl according to the principles of the present invention.

It has been experimentally shown that the crystallized alkali salt mixture crystallizes in a form that can be easily separated from the concentrated calcium chloride solution. A dry matter content of over 90 percent by weight could be reached. The separated salt mixture is thereafter washed with water or preferably a recycled process solution saturated with regard to NaCl and/or KCl to remove residual calcium chloride present in cake water. It has been satisfyingly shown in experiments with artificial solutions that water washing enables to obtain a mixture of NaCl and KCl with less than 0.2% residual $CaCl_2$.

However, when operating with APCBP leach-solution having a pH level of 11.8 before evaporation and a pH of 9.3 after evaporation, the crystallized mixture of NaCl and KCl contained also a water-insoluble calcium component of generally above 5% by weight. It was impossible to wash off the calcium component from the crystallized salt mixture by either using water or a salt solution. In further experiments it was, however, found that the calcium component was soluble in hydrochloric acid. The conclusion was that since APCBP leach-solution has generally a high pH, during the concentration of the APCBP leach-solution a precipitate of calcium hydroxide is formed.

The solubility of calcium hydroxide in water is ca 1.5 grams per kg solution at 20° C. and the solubility decrease to about 1 gram per kg solution at 70° C. Therefore, during the evaporation of MSWIFA wash-water, the high alkalinity results in the precipitation of calcium hydroxide according to e.g. the following chemical reaction:

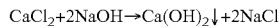
$CaCl_2 + 2NaOH \rightarrow Ca(OH)_2 \downarrow + 2NaCl$

Up to about 5% of the calcium content in APCBP leach-solution was found to be precipitated in this form together with NaCl and KCl which in many applications may be an unacceptable level of impurity.

However, the formation of calcium hydroxide could be easily eliminated by neutralizing the APCBP leach-solution with hydrochloric acid e.g. prior to evaporation. Consumption of hydrochloric acid for that purpose was moderate in the order of about 8 kg of 30% HCl per ton of APCBP leach-solution. It should be clear that neutralization of the APCBP leach-solution can be done before evaporation, after evaporation, or even during post treatment operation of the recovered salts.

Satisfyingly, it was experimentally proven that after neutralization of APCBP leach-solution with hydrochloric acid, crystallized NaCl+KCl mixture after washing contained only 0.03% residual calcium hydroxide by weight.

Similarly, if the acid aqueous solutions are used as start material, partial or full neutralization may be requested at some stage during the processes. This can be performed by e.g. adding a base or a basic oxide. It should be clear that neutralization of the aqueous solution can be done before evaporation, after evaporation, or even during post treatment operation of the recovered salts.

In other words, in one embodiment of the method, the neutralization comprises one of addition of an acid and addition of a base. In a corresponding embodiment of an arrangement for recovery of salt, the neutralization arrangement comprises a neutralization adding arrangement, arranged for adding one of an acid and a base.

The mixture of NaCl+KCl can thereafter be separated by e.g. state of the art techniques, c.f. FIG. 5. One example of such a technique is dissolution in water followed by treatment in an evaporator crystallizer for recovery of NaCl and thereafter treatment with a cooling crystallizer for recovery of KCl and recycling of mother liquid.

However, in an alternative embodiment, a much more efficient way of separating the salt mixture is based on a temperature cycling. Returning to FIG. 13, the solid mix of the NaCl and KCl 32 is contacted with hot recycled process solution. This will be further described below. The hot recycled process solution is an aqueous solution 90 composed of sodium chloride at about saturation and dissolved potassium chloride considerably below saturation. The temperature of the hot recycled process solution, i.e. the aqueous solution 90, can be any temperature above 0° C., preferably above 50° C., more preferably above 100° C. as the solubility of potassium chloride is increasing with increased temperature. However, other aspects can be considered when choosing operational temperature such as energy costs, available by-product heat, etc. which can result in choosing a temperature lower than 100° C. as preferred temperature of operation.

The alkali salt mixture, i.e. the solid mix 32 composed of sodium chloride and potassium chloride is thus fed into the hot process solution 90 for dissolving mainly its potassium chloride content. The solubility of potassium chloride is increasing with increased temperature and therefore a high temperature is as mentioned above usually preferred.

The dissolution of potassium chloride from the solid salt mixture can be done e.g. by feeding the solid mix 32 of NaCl and KCl into the dissolver 42, e.g. a stirred reactor 41. The rate of feeding the solid mix 32 into the stirred reactor 41 can be controlled by measuring the potassium concentration in solution. This can be done by using a potassium online measuring electrode, or any other direct/indirect measurement of soluble potassium. Such measurements of potassium content are, as such, well-known in the art and are therefore not described more in detail. The potassium concentration in the solution, i.e. the mixed aqueous solution 43, should be kept below its saturation level at the operational temperature. In that way, complete dissolution of the potassium content from the mixed salts can be assured.

Since the recycled aqueous solution 90 is at least almost saturated with sodium chloride but considerably below saturation regarding potassium chloride at the operational temperature, a selective dissolution of potassium chloride takes place. This means that potassium chloride from the solid mix 32 is dissolved but at least the main part of the sodium chloride is kept in solid crystal form. It has satisfyingly been experimentally found that despite of the fact that the solid mix 32 of the two salts (NaCl and KCl) are co-crystallized at high temperature during water evaporation, potassium chloride was not locked inside sodium chloride crystals, which enables complete dissolution of the potassium content even when using a saturated hot sodium chloride solution as dissolving medium.

The above described control of the feeding of the solid mix 32 of salt to the dissolver 42 enables to process a feed of solid mix 32 that change in composition with time, which is typical for processing APC by-products as described before. The actual ratio between KCl and NaCl is not necessary to know in detail, as long as the potassium chloride content is not allowed to reach saturation. This is very different from separation techniques based on evaporation from aqueous solutions with varying salt ratios, where the entire process has to be planned from the actual ratio.

After dissolution of potassium from the solid mix 32 of salt, the slurry 43 is fed to the separator arrangement 44, where a NaCl separator 45, a solid/liquid separation device such as a centrifuge, belt filter, filter press, disk filter, drum filter, etc. is arranged for separation of solid sodium chloride 48. The sodium chloride 48 is preferably washed e.g. with water to remove residual potassium chloride in the adhering cake water. It was experimentally found that a sodium chloride 48 product with a purity of over 99% could be produced from APCBP leach-solution in that manner. Of course, the sodium chloride 48 can be post processed to increase its quality even further e.g. by recrystallization, etc.

The solution 96 after separation of solid sodium chloride 48 at high temperature is saturated with sodium chloride and contains also a relatively high concentration of dissolved potassium chloride below, but close to, its saturation level at the high temperature.

The solution 96 is thereafter cooled in a temperature controller 46 to below 100° C., more preferably below 40° C. and most preferably below 20° C. The temperature should at least be lower than the temperature in the dissolver 42. By cooling the solution, the solubility of sodium chloride is being increased but that of potassium chloride is decreased. This leads to selective precipitation of potassium chloride, while the sodium chloride content instead is brought further from the solubility limit. The slurry 97 is thereafter separated in a KCl separator 47, where a solid/liquid separation device such as a centrifuge, belt filter, filter press, disk filter, drum filter, etc. is arranged for separation of solid potassium chloride 50. The potassium chloride 50 is preferably washed e.g. with water to remove residual sodium chloride in the adhering cake water. It was experimentally found that a potassium chloride 50 product with a purity of over 99% could be produced from APCBP leach-solution in that manner. Of course, the potassium chloride 50 can be post processed to increase its quality even more e.g. by recrystallization, etc. The solution 92 after separation of solid potassium chloride 50 at low temperature is saturated with regard to potassium chloride but under-saturated regarding sodium chloride.

The solution 92 after separation of solid potassium chloride is brought to a NaCl/KCl recycling arrangement 91. The NaCl/KCl recycling arrangement 91 is arranged to increase the temperature of the solution 92 to the desired operational temperature for being provided to the dissolver 42. This is performed by use of any possible means for heat exchange 94. In a preferred embodiment, the means for heat exchange 94 cooperates with the temperature controller 46, as indicated by the dotted line 95, to reuse some heat extracted from the temperature controller 46 in the means for heat exchange. The temperature is preferably increased to above 50° C. more preferably about 100° C., as discussed before. By increasing the temperature, the recycled aqueous solution 90 becomes essentially saturated regarding sodium chloride again, but considerably under-saturated regarding potassium chloride. This solution 90 is therefore, recycled back to be contacted with more feed of the solid mix 32 of NaCl+KCl.

Since the system for separation of NaCl/KCl according to this embodiment is based on only heat exchange and not on evaporation of water, closed loop of recirculating process solution may be formed. It should be clear that addition of water/salt solution or diversion of a bleed can be required in order to keep a constant water balance. Hence water can be both added and/or removed with cake water adhering to the salts. Other reasons for bleeding a solution out of the closed cycle are e.g. control of a low steady state concentration of dissolved calcium chloride which enters the system via cake water, etc. Removed bleed can be recycled back to be mixed with e.g. feed solution to the evaporator 33, etc.

In other words, in one embodiment, the dissolver 42 is arranged for dissolving the KCl and optionally a part of the NaCl in the aqueous solution at a first temperature to obtain a first concentration of KCl. The first concentration of KCl is lower than a solubility concentration of KCl at the first temperature. The separator arrangement 44 comprises a NaCl separator 45 for separating any solid NaCl 48 from the mixed aqueous solution at the first temperature. The separator arrangement 44 further comprises a temperature controller 46 for lowering a temperature of the mixed aqueous solution 96 to a second temperature. The temperature controller 46 is situated downstream of the NaCl separator 45. The second temperature is lower than the first temperature. The separator arrangement 44 further comprises a KCl separator 47 for separating any precipitated KCl 50 from the mixed aqueous solution at the second temperature. The arrangement for recovery of salts further comprises a NaCl/KCl recycling arrangement 91, situated downstream of the KCl separator 47. The NaCl/KCl recycling arrangement 91 is arranged for heating and recycling at least a part of the mixed aqueous solution to the dissolver 42.

Figure 15:
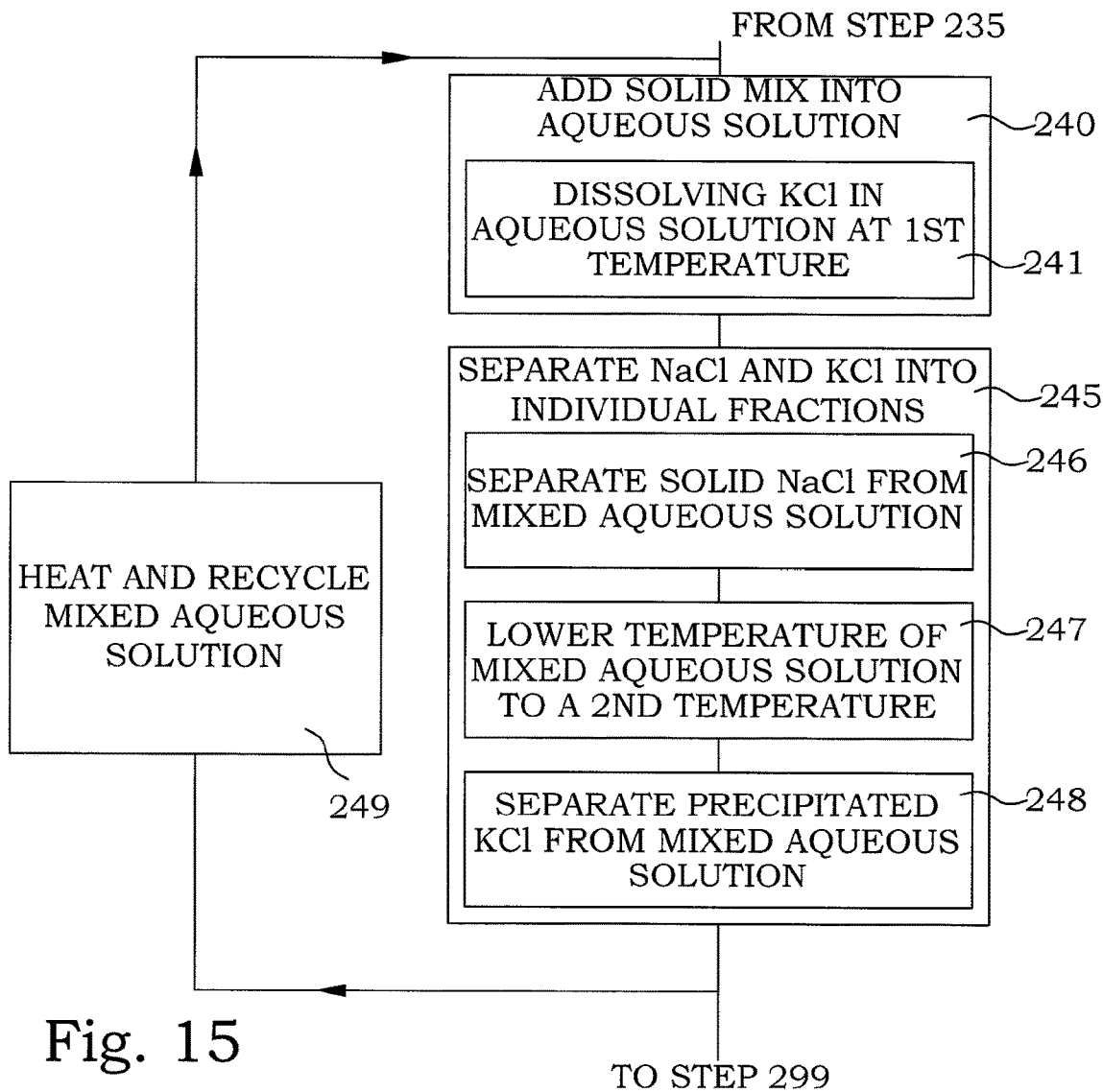
FIG. 15 is a flow diagram of part steps of an embodiment of steps of adding a solid mix into an aqueous solution and separating NaCl and KCl into individual fractions.

FIG. 15 illustrates a flow diagram of a part of an embodiment of a method for recovery of salts. The process starts from the step 235 of FIG. 4. In the present embodiment, the step of adding 240 the solid mix of the NaCl and KCl into the aqueous solution comprises, in step 241, dissolving of the KCl and optionally a part of the NaCl in the aqueous solution at a first temperature to obtain a first concentration of KCl. The first concentration of KCl is lower than a solubility concentration of KCl at the first temperature. The step of separating 245 the NaCl and KCl into individual fractions in turn comprises part steps. In step 246, any solid NaCl is separated from the mixed aqueous solution at the first temperature. In step 247, a temperature of the mixed aqueous solution is lowered to a second temperature. The second temperature is lower than the first temperature. Step 247 is performed after the step 246 of separating any solid NaCl. In step 248, any precipitated KCl is separated from the mixed aqueous solution at the second temperature. The method further comprises the further step 249, in which at least a part of the mixed aqueous solution is heated and recycled for a further said adding 240 of the solid mix of the NaCl and KCl. The recycling step 249 is performed after the step 248 of separating of the precipitated KCl.

The process according to the technology presented herein is robust and can handle the variability in the ratios of salts, e.g. in the incoming APCBP leach-solution. Separation of all three salts is possible with a single evaporator which means low capital cost. The process is simple with simple process control and only heat exchange is needed for NaCl and KCl crystallization. No evaporation of water occurs during this part of the process, which means that the operational costs are low.

Recently it has been found that the best deicing effect can be obtained by combining sodium chloride and calcium chloride to be used in form of a solution for deicing purposes. Tests were made using various combinations of sodium chloride and calcium chloride in order to find the optimal composition of a deicing solution. In the tests it was found that if there is too much calcium chloride mixed with sodium chloride, the road surface does not dry up in a satisfactory manner.

According to the optimization tests it was found that there is a breakpoint when the road salt solution contains 20 parts of a calcium chloride solution (36% by weight) mixed with 80 parts of a sodium chloride solution (23% by weight). The specific mixture is equivalent to 17.9% weight sodium chloride, 8% weight calcium chloride, and 74.1% weight of water.

At this specific mixing ratio, the road dries up as fast as if pure sodium chloride solution had been used. The specific mixture was clearly superior to the use of each of the salts separately in pure form. The main advantages were as follows:

Fast drying—even on pedestrian and bicycle paths where the drying effect of car traffic is lacking Lower freezing temperatures—good results for ice control down to minus 15 degrees Fewer re-freezing events—traditional deicing requires often spreading of road salt two times per night because of re-freezing during the morning. Using the specific mixture of sodium chloride and calcium chloride only a single spreading per night is required. The number of call-outs per season is estimated to be reduced by about 30%.

Activating the road salt by sweeping—It was found that due to residual calcium chloride in the asphalt, the road salt could be activated one more time by just sweeping without an additional application of road salt Improve the air quality around the roads—the road salt mixture was found to bind small dust particles To replace a third of sodium chloride with calcium chloride is also more environmentally friendly to the arable land along the road. It was found that it results in better soil structure which means higher yields for crops along the road (20 m distance from the road), as well as less leaching of phosphorus and nitrogen to the ditches A main advantage of the present technology is that it enables to produce an efficient road salt from waste incineration fly ash. The invention enables to separate the three salts: sodium chloride, potassium chloride and calcium chloride in pure forms. Separated sodium chloride can be stored in pure solid form during the summer (in which there is no need for road salt). A part of the separated calcium chloride can be used for dust control during the summer. A second part of the calcium chloride is mixed with the stored sodium chloride in a specific formula to form an efficient road salt during winter time. Purified condensate can be used as a water source. Separated potassium chloride has a high commercial value as a fertilizer and therefore can be granulated to be used as a potassium fertilizer or be used as a raw material for production of compound fertilizers, etc.

In this way, the present technology enables to valorize fly ash in a practical way that enables manageable logistics for outlets for recovered salts present in fly ash.

Several alternatives exist for post treating the recovered calcium chloride solution to increase its purity. In other words, one embodiment of an arrangement for salt recovery further comprises a $CaCl_2$ purifier 30 (FIG. 5) connected to an output from the salt mix separator 28 (FIG. 5). The $CaCl_2$ purifier 30 (FIG. 5) is arranged for purifying the depleted aqueous solution 34 (FIG. 5) from residual alkali salts. A corresponding embodiment of a method, comprises the further step of purifying 250 (FIG. 4) the depleted aqueous solution of $CaCl_2$ from residual alkali salts.

Figure 16:
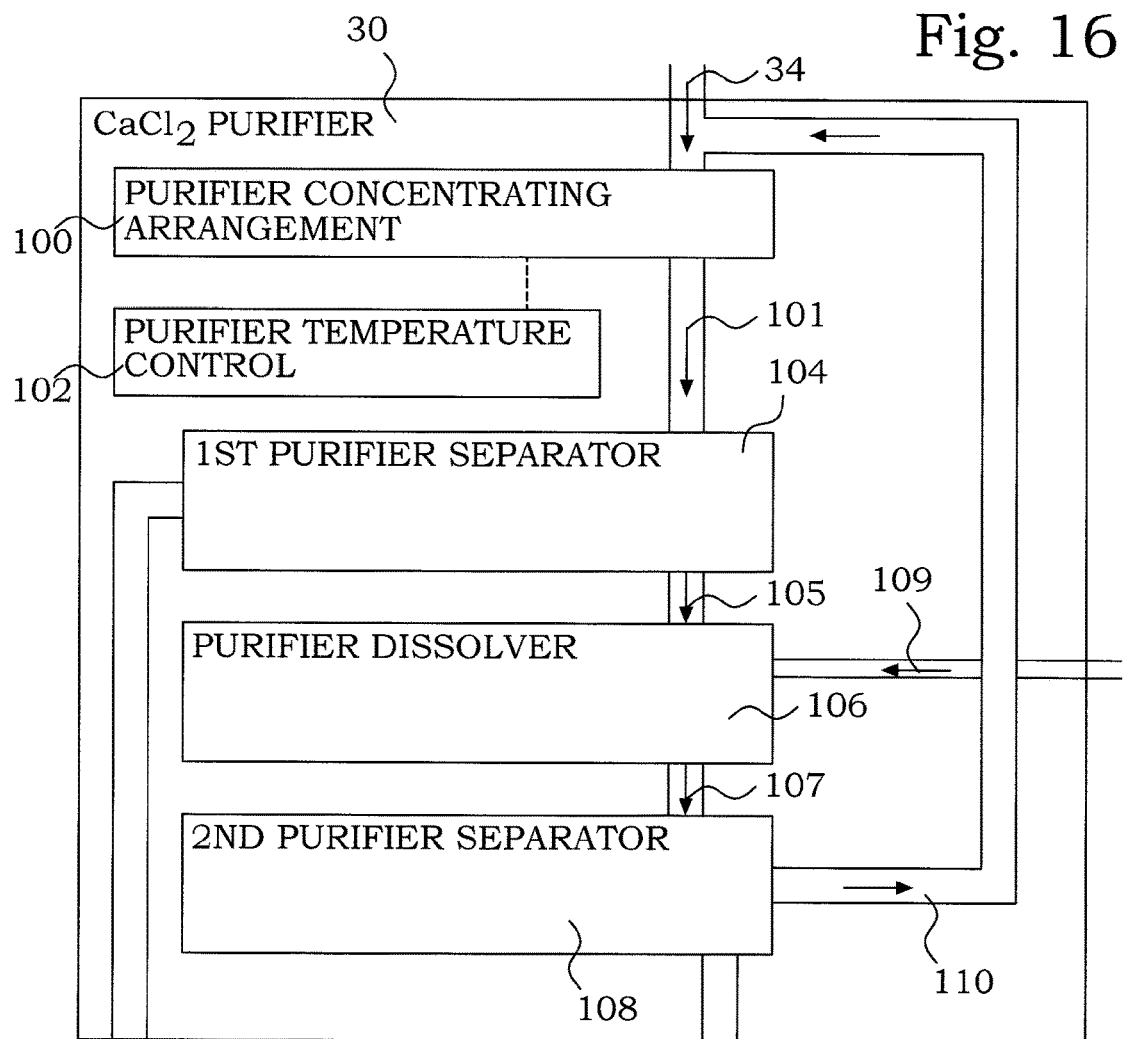
FIG. 16 is a block diagram of parts of an embodiment of a $CaCl_2$ purifier of an arrangement for recovery of salts.

FIG. 16 illustrates one such alternative. The calcium chloride solution 34 can be concentrated in a purifier concentrating arrangement 100 to above 60% by weight. This can as described further above be performed by adding Ca and Cl ions and/or by reduce the water content. At high concentration of calcium chloride, residual potassium chloride is crystallized in form of a double salt with calcium chloride. The temperature of the solution 101 provided by the purifier concentrating arrangement 100 has to be controlled by a purifier temperature control 102 in order to keep the calcium chloride dissolved in solution. In other words, the temperature should be generally above 80° C. and in some cases above 150° C. Thereafter, the crystallized double salt of $KCl.CaCl_2$ 105 is separated by any suitable solid/liquid operation in a first purifier separator 104 to remove the double salt of $KCl—CaCl_2$ 105 from a purified calcium chloride solution 36.

The double salt of $KCl.CaCl_2$ 105 can thereafter be broken by dissolving in a purifier dissolver 106 in liquid, typically water 109, to form a calcium chloride solution below saturation at a concentration of below 60% $CaCl_2$ by weight, preferably below 44% $CaCl_2$ by weight. After breaking the double salt, potassium chloride is precipitated and the slurry 107 is provided to a second purifier separator 108. In the second purifier separator 108, the precipitated potassium chloride 50 can be separated from the calcium chloride solution by any suitable solid/liquid separation. The calcium chloride solution 110 with residual dissolved potassium after separating precipitated KCl 50 can be recycled back to the purifier concentrating arrangement 100 to be concentrated to over 60% by weight again.

In other words, in one embodiment of an arrangement for salt recovery, the $CaCl_2$ purifier 30 comprises a purifier concentrating arrangement 100. The purifier concentrating arrangement 100 is arranged for increasing a $CaCl_2$ concentration to be above 60% by weight. This is performed by at least one of removing water from the depleted aqueous solution and adding $CaCl_2$. The $CaCl_2$ purifier 30 further comprises a purifier temperature control 102, arranged for controlling a temperature of the depleted aqueous solution 101 to exceed a solubility temperature for the concentration of $CaCl_2$, causing $KCl—CaCl_2$ to precipitate. The $CaCl_2$ purifier 30 also comprises a first purifier separator 104, connected to the purifier concentrating arrangement 100. The first purifier separator 104 is arranged for separating the precipitated $KCl—CaCl_2$ 105, giving a purified $CaCl_2$ aqueous solution 36. The $CaCl_2$ purifier 30 further comprises a purifier dissolver 106, connected to the first purifier separator 104. The purifier dissolver 106 is arranged for re-dissolving the separated precipitated $KCl.CaCl_2$ 105 in an aqueous solution into a non-saturated aqueous solution 107 of $CaCl_2$, causing KCl to precipitate. The $CaCl_2$ purifier 30 further comprises a second purifier separator 108, connected to the purifier dissolver 106. The second purifier separator 108 is arranged for separating precipitated KCl 50. In a further embodiment, the $CaCl_2$ purifier further comprises a purifier recycling arrangement 110, connected between the second purifier separator 108 and the purifier concentrating arrangement 100. The purifier recycling arrangement 110 is arranged for recycling the non-saturated aqueous solution 110 of $CaCl_2$ to the purifier concentrating arrangement 100.

Figure 17:
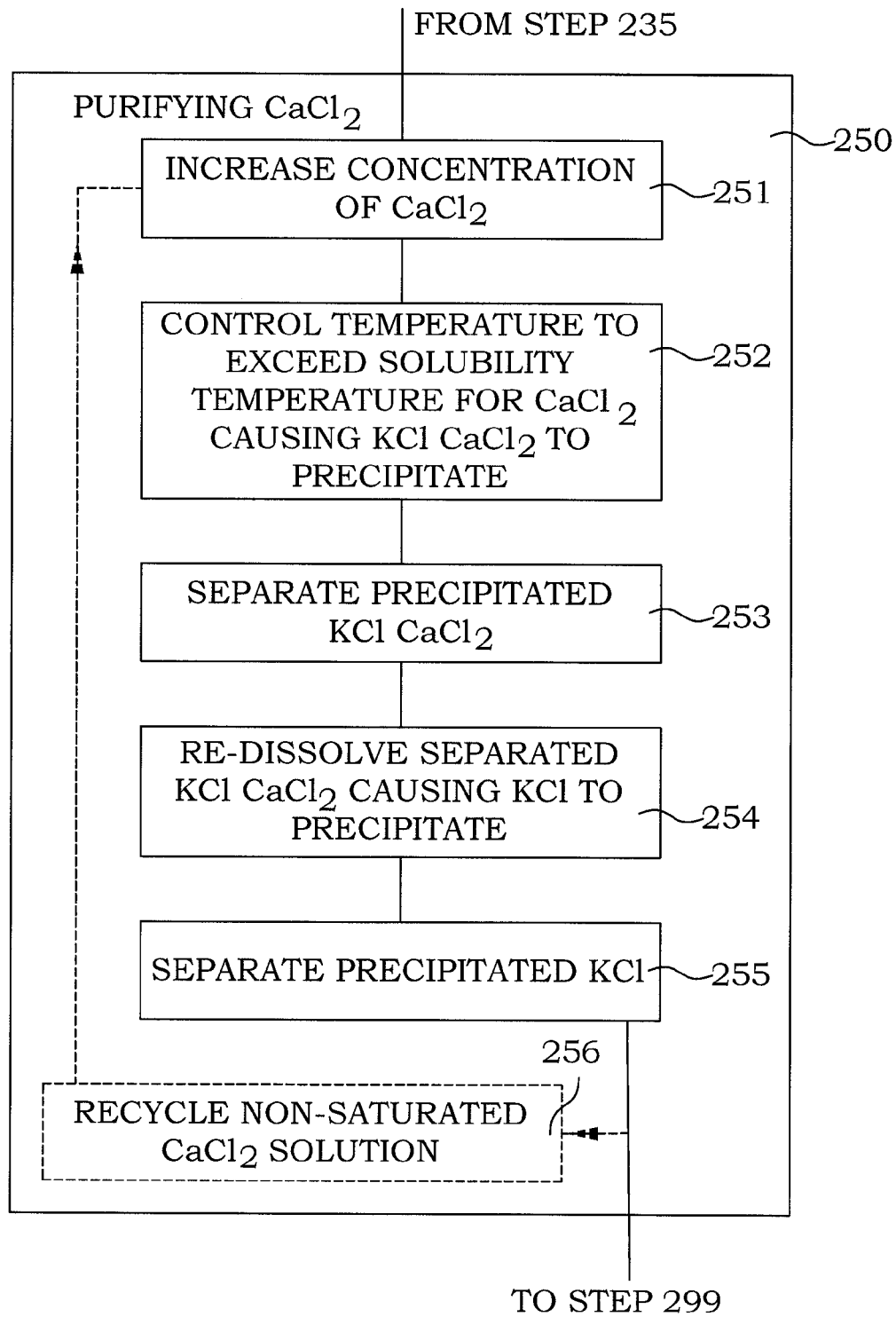
FIG. 17 is a flow diagram of part steps of an embodiment of a step of purifying $CaCl_2$)

FIG. 17 illustrates a flow diagram of part steps in an embodiment of the step of purifying $CaCl_2$ 250 in FIG. 4. The step of purifying 250 in turn comprises the step 251, in which a $CaCl_2$ concentration is increased to be above 60% by weight. This is performed by at least one of removing water from the depleted aqueous solution and adding $CaCl_2$. In step 252, a temperature of the depleted aqueous solution is controlled to exceed a solubility temperature for the concentration of $CaCl_2$, causing KCl—$CaCl_2$ to precipitate. In step 253, the precipitated KCl—$CaCl_2$ is separated, which gives a purified $CaCl_2$ aqueous solution. In step 254, the separated precipitated KCl·$CaCl_2$ is re-dissolved in an aqueous solution into a non-saturated aqueous solution of $CaCl_2$. This causes KCl to precipitate. In step 255, precipitated KCl is-separated. In a further embodiment, the method further comprises step 256, in which the non-saturated aqueous solution of $CaCl_2$ is recycled into the depleted aqueous solution before or during the step 251 of increasing the $CaCl_2$ concentration.

Figure 18:
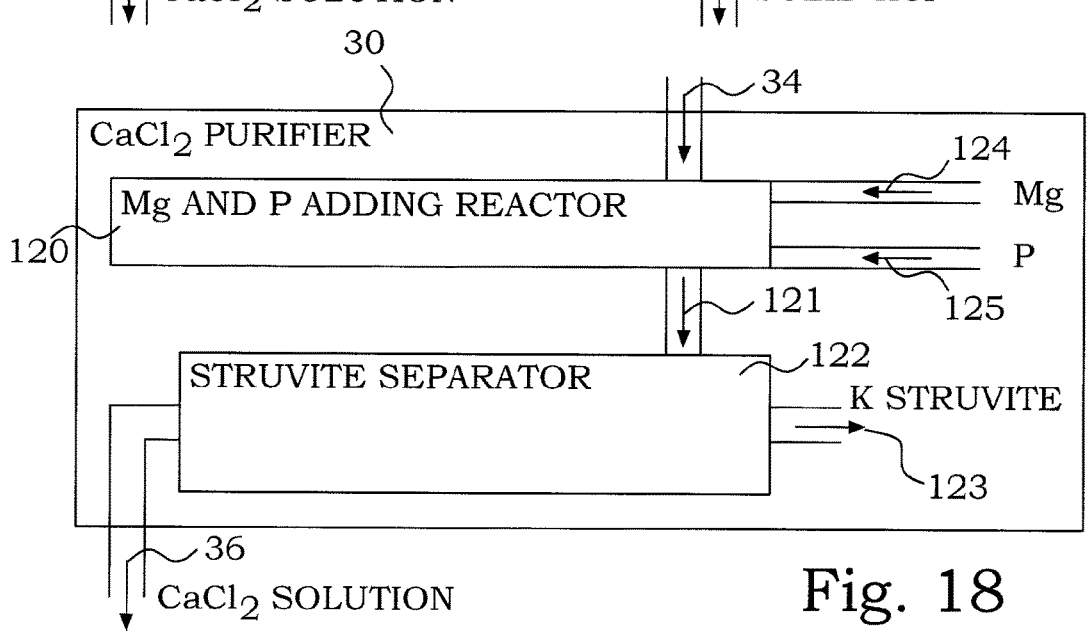
FIG. 18 is a block diagram of parts of another embodiment of a $CaCl_2$ purifier of an arrangement for recovery of salts.

An additional alternative to further purify the calcium chloride solution is illustrated in FIG. 18. In this embodiment, residual potassium chloride can be precipitated from the calcium chloride solution, i.e. the depleted aqueous solution 34, in form of K-struvite, i.e. MgKPO4 and crystal water. The depleted aqueous solution 34 is entered into a Mg and P adding reactor 120, where a magnesium source 124 such as $Mg(OH)_2$, $MgCl_2$, etc., is added and where a phosphorus source 125, such as $Ca(H_2PO_4)_2$, $H_3PO_4$, etc., also is added. This results in precipitation of K-struvite. A slurry 121 with precipitated K-struvite is provided to a struvite separator 122, in which precipitated K-struvite 123 can be separated from the calcium chloride solution 36 by any suitable solid/liquid separation technique. Removed K-struvite 123 can be used as a combined phosphorus and potassium fertilizer. A calcium chloride solution 36 of higher purity can thus be produced at e.g. room temperature without requirement for up-concentrating to above 60% by weight.

In other words, in one embodiment of an arrangement for salt recovery, the $CaCl_2$ purifier 30 comprises a Mg and P adding reactor 120 arranged for adding Mg ions 124 and phosphate ions 125 to the depleted aqueous solution 34, causing precipitation of $MgKPO_4$. The $CaCl_2$ purifier 30 further comprises a struvite separator 122, arranged for separating the precipitated $MgKPO_4$ 123, giving a purified $CaCl_2$ aqueous solution 36.

Figure 19:
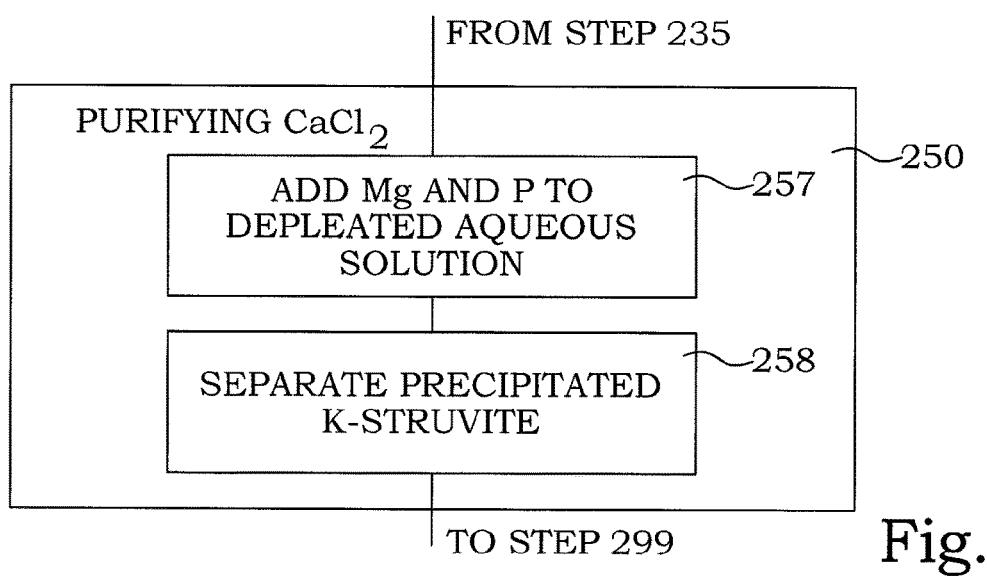
FIG. 19 is a flow diagram of part steps of another embodiment of a step of purifying $CaCl_2$.

FIG. 19 illustrates a flow diagram of part steps in an embodiment of the step of purifying $CaCl_2$ 250 in FIG. 4. The step of purifying 250 in turn comprises the step 257, in which Mg ions and phosphate ions are added to the depleted aqueous solution, causing precipitation of $MgKPO_4$. In step 258, the precipitated $MgKPO_4$ is separated, giving a purified $CaCl_2$ aqueous solution.

Of course, any other methods used for removal of potassium chloride from calcium chloride can be used for further purification of the produced calcium chloride solution. Examples include treating with ammonia e.g. according to U.S. Pat. No. 3,279,897 or treating with organic additive e.g. according to U.S. Pat. No. 3,359,079.

Figure 20:
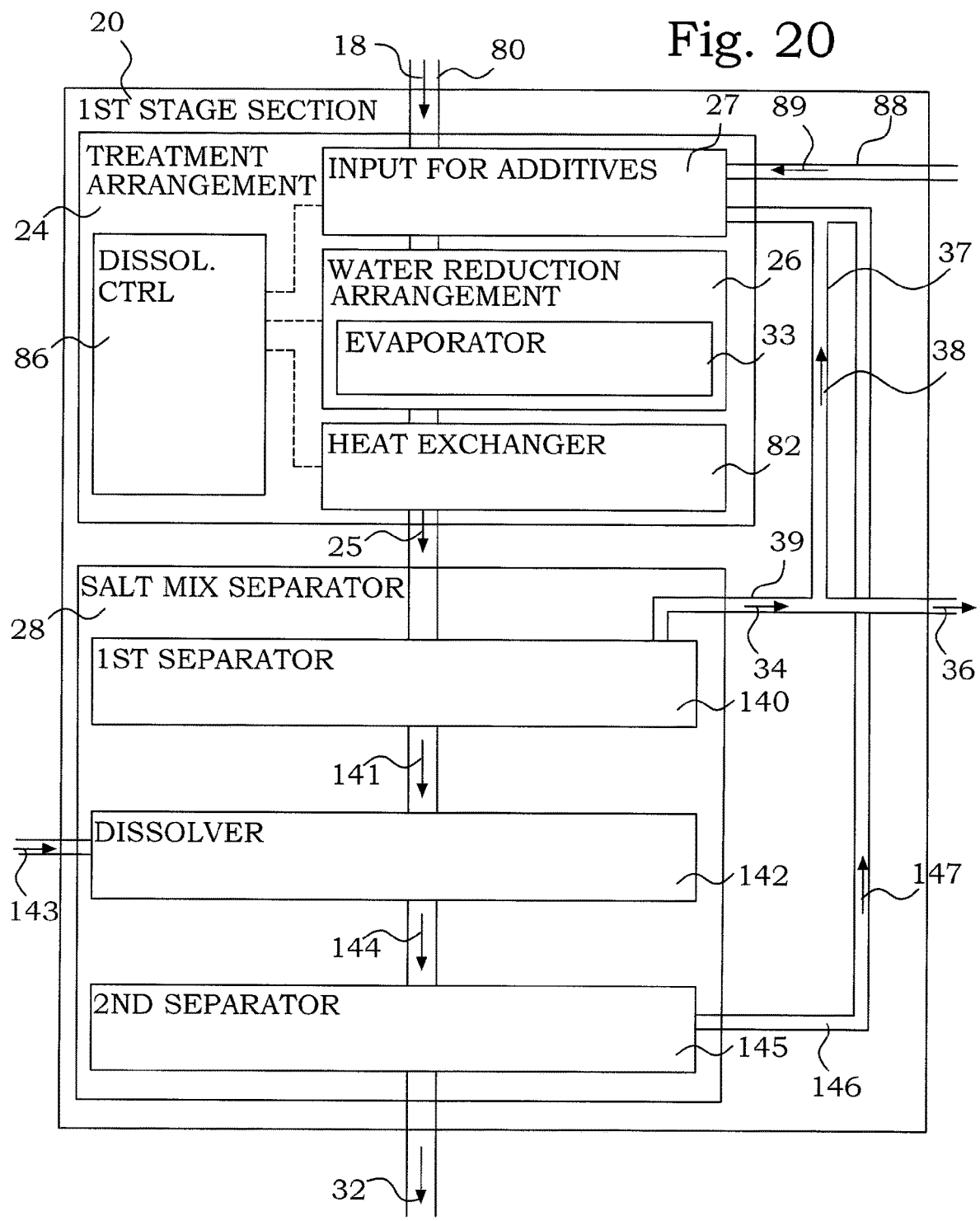
FIG. 20 is a block diagram of parts of an embodiment of a first stage section of an arrangement for recovery of salts.

In alternative embodiments, the main process of separating Ca from K and Na can be modified to directly give a higher purity of the $CaCl_2$ solution. However, the purity of the initial NaCl and KCl mix is degraded and additional measures have to be taken for assuring high purity end products. As shown in FIG. 20, the initial aqueous solution, e.g. pre-treated APCBP leach-solution, can be directly concentrated in a concentrator constituted e.g. by the input for additives 27 and the water reduction arrangement 26 to a calcium chloride concentration of above 60%. This results in precipitating of a mixture of NaCl and a double salt of KCl—$CaCl_2$ in the enriched aqueous solution 25. The temperature of the enriched aqueous solution 25 has to be controlled in order to keep the calcium chloride dissolved in solution, i.e. the temperature should be generally above 80° C. and in some cases above 150° C.

Thereafter the enriched aqueous solution 25 is transferred to the salt mix separator 28. The salt mixture containing Na, K as well as Ca salts 141, and in this particular embodiment containing the double salt of KCl·$CaCl_2$, can be separated in a first separator 140 by any suitable solid/liquid operation to remove the salt mixture containing Na, K as well as Ca salts 141 from a purified calcium chloride solution 34. The purified calcium chloride solution 36 can be further processed e.g. to form solid flakes for sale, etc.

The salt mixture containing Na, K as well as Ca salts 141, and in this particular embodiment containing the double salt of KCl·$CaCl_2$ can thereafter be broken in a dissolver 142 by dissolving at least a part of the salt mixture in a liquid 143, typically water, to form a calcium chloride solution 144 below saturation at a concentration of below 60% $CaCl_2$ by weight, preferably below 44% $CaCl_2$ by weight. After breaking the double salt, sodium chloride and potassium chloride may form a solid mixture, as in previous embodiments. This solid mix 32 of sodium chloride and potassium chloride can be separated in a second separator 145 from the remaining calcium chloride solution 147 by any suitable solid/liquid separation equipment. The calcium chloride solution 147 with residual dissolved potassium after separating precipitated KCl+NaCl can be recycled back by a recycling arrangement 146 to the input for additives, to participate in the concentration to over 60% by weight. The solid mix 32 of NaCl and KCl may be further processed as described above.

In other words, in one embodiment of an arrangement for salt recovery, the treatment arrangement 24 is arranged for causing a solid mix comprising chloride salts of Na, K and Ca. The salt mix separator 28 comprises a first separator 140 arranged for separating the solid mix 141 comprising chloride salts of Na, K and Ca. The salt mix separator 28 further comprises a dissolver 142 connected to the first separator 140 and arranged for at least partially re-dissolving the separated solid mix 141 comprising chloride salts of Na, K and Ca in an aqueous solution. This causes at least salts comprising the Ca to dissolve and give a non-saturated water solution 144 comprising $CaCl_2$. The salt mix separator 28 further comprises a second separator 145 connected to the dissolver 142 and arranged for separating remaining precipitated NaCl and KCl from the non-saturated water solution 144 of $CaCl_2$). In a further embodiment, the salt mix separator 28 comprises a recycling arrangement 146 connected between the second separator 145 and an input of the treatment arrangement 24. The recycling arrangement 146 is arranged for recycling the non-saturated aqueous solution 147 of $CaCl_2$ to be used as additive of Ca ions and Cl ions in the treatment arrangement 24.

In this embodiment, the treatment arrangement comprises a concentrator arranged for concentrating the start material 18 into an enriched aqueous solution 25 having a concentration of $CaCl_2$ above 60% by weight, causing $KCl$—$CaCl_2$ to precipitate. The first separator 140 is thus arranged for separating the precipitated NaCl and $KCl$—$CaCl_2$ 141. The dissolver 142 is arranged for partially re-dissolving the separated precipitated NaCl and $KCl.CaCl_2$ in an aqueous solution into a non-saturated aqueous solution 144 of $CaCl_2$, causing at least the $KCl.CaCl_2$ to dissolve and give the non-saturated aqueous solution 147 of $CaCl_2$. In a further embodiment, the dissolver is arranged to give a non-saturated aqueous solution 147 of $CaCl_2$ with a concentration exceeding 36% by weight.

FIG. 19 illustrates a flow diagram of part steps in an embodiment of the step 235 of separating solid mix of NaCl and KCl in FIG. 4. The step of treating 230 (FIG. 4) the start material comprises for this embodiment the action for causing a precipitation comprising chloride salts comprising Na, K and Ca. The step of separating 235 thereby in turn comprises the step 236, in which the precipitation comprising chloride salts of Na, K and Ca are separated from the enriched aqueous solution. In step 237, the separated precipitation comprising chloride salts of Na, K and Ca are at least partially re-dissolved in an aqueous solution. This causes at least salts comprising the Ca to dissolve and give a non-saturated aqueous solution comprising $CaCl_2$. In step 238, remaining precipitated NaCl and KCl is separated from the non-saturated water solution of $CaCl_2$. In a particular embodiment, the step 237 of partially re-dissolving the separated precipitated NaCl and $KCl$—$CaCl_2$ is performed to give a non-saturated aqueous solution of $CaCl_2$) with a concentration exceeding 36% by weight. In a particular embodiment, the method further comprises the step 239, in which the non-saturated aqueous solution comprising $CaCl_2$ is recycled to be used as additive of Ca ions and Cl ions in the step 230 (FIG. 4) of treating the start material.

In this particular embodiment, the step of treating 230 (FIG. 4) the start material in turn comprises the step of concentrating the initial aqueous solution into an enriched aqueous solution having a concentration of $CaCl_2$ above 60% by weight, causing $KCl$—$CaCl_2$ to precipitate. Therefore, the step 236 of separating precipitation of the step 235 of separating the solid mix in turn comprises separating of precipitated NaCl and $KCl.CaCl_2$. The step 237 similarly comprises partially re-dissolving the separated precipitated NaCl and $KCl.CaCl_2$ in an aqueous solution into a non-saturated aqueous solution of $CaCl_2$, causing at least the $KCl.CaCl_2$ to dissolve and give the non-saturated aqueous solution of $CaCl_2$.

A further treatment alternative for the process according to the invention can also be illustrated by FIG. 20. In this alternative the incoming initial aqueous solution, e.g. the APCBP leach-solution, is concentrated in the treatment arrangement 24 to a calcium chloride concentration below 60% by weight. The temperature during solid/liquid separation is here controlled to form an over-saturated solution of calcium chloride. In this case a mixture of NaCl, KCl is precipitated together with a part of the $CaCl_2$. Calcium chloride is precipitated in form of $CaCl_2.6H_2O$, $CaCl_2.4H_2O$, and/or $CaCl_2.2H_2O$, and mixtures of the above salts occur according to the prevailing temperature. The mixture of the three salts 141 is separated from the calcium chloride solution 34 which can be sold as a final product for deicing, dust control, etc. or further purified as described in the previous text.

The solid mixture of the three salts 141 is thereafter treated by dissolving in the dissolver 142 in a liquid 143 such as water or salt solution to form a calcium chloride solution 144 below saturation at a concentration of below 60% $CaCl_2$ by weight, preferably below 44% $CaCl_2$ by weight. A mixture of sodium chloride and potassium chloride 32 can be thereafter separated in the second separator 145 from the calcium chloride solution 147 and processed according to the principles described before. The calcium chloride solution 147 can be recycled back by the recycling arrangement 14 back into the process or recovered as product.

In other words, in one embodiment of an arrangement for salt recovery, treatment arrangement 24 comprises a concentrator arranged for concentrating the start material 18 into an enriched aqueous solution 25 having a concentration of $CaCl_2$ of less than 60% by weight. The temperature control is arranged for controlling a temperature of the enriched aqueous solution 25 to cause precipitation of NaCl, KCl and $CaCl_2$ with crystal water. The first separator 140 is arranged for separating the precipitated NaCl, KCl and $CaCl_2$ with crystal water. The dissolver 142 is arranged for partially re-dissolving the separated precipitated NaCl, KCl and $CaCl_2$ with crystal water in the non-saturated aqueous solution of $CaCl_2$, causing at least the $CaCl_2$ with crystal water to dissolve and give the non-saturated aqueous solution of $CaCl_2$. The solid mix 32 of NaCl and KCl is then separated by the second separator 145.

Figure 21:
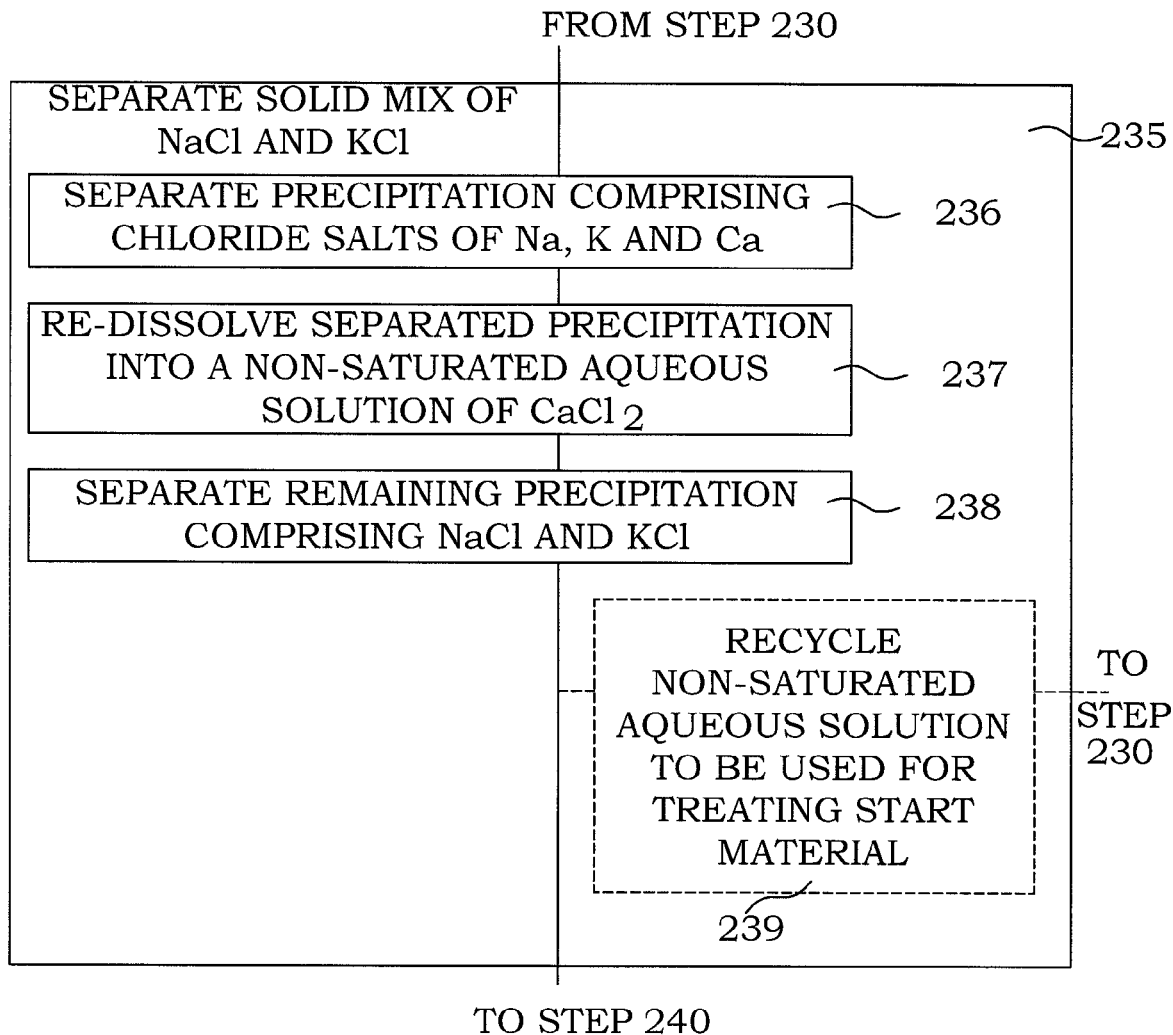
FIG. 21 is a flow diagram of part steps of an embodiment of a step of separating a solid mix of NaCl and KCl.

With reference to FIG. 21, one embodiment of a method for recovery of salt comprises a step of treating 230 (FIG. 4) the start material which in turn comprises concentrating the initial aqueous solution into an enriched aqueous solution having a concentration of $CaCl_2$ of less than 60% by weight and controlling a temperature of the enriched aqueous solution to cause precipitation of NaCl, KCl and $CaCl_2$ with crystal water. The step 236 in the step 235 of separating the solid mix of the NaCl and KCl comprises separating of the precipitated NaCl, KCl and $CaCl_2$ with crystal water. The step 237 comprises partially re-dissolving of the separated precipitated NaCl, KCl and $CaCl_2$ with crystal water in the non-saturated aqueous solution of $CaCl_2$, causing at least the $CaCl_2$ with crystal water to dissolve and give the non-saturated aqueous solution of $CaCl_2$. The solid mix of NaCl and KCl is then separated in step 238.

Even if processing of APC by-products is the main application of the present disclosure it should be clear that any salt containing solution (NaCl and/or KCl, optionally $CaCl_2$) or solid salts can be treated according to the disclosed principles. For example, incineration waste (IW) by-products such as bottom ash can in some cases contain high concentration of water soluble salts.

In addition, solid residues from ZLD systems treating e.g. wastewater from shale gas fracking operation, RO desalination concentrates, ion-exchange softeners concentrate, landfill leachate, mine waters, etc. (not limited to described examples) can be collected and processed for salt recovery in a central plant. Wastes containing a single salt component e.g. NaCl, KCl, or $CaCl_2$ can be mixed in a central plant treating a multiple components of the salts NaCl, KCl and $CaCl_2$. The principles in the following disclosure can also be used for separating mixture of pure salts of NaCl and KCl originating from extraction from minerals, salt lakes, etc.

Processing solids can be done by dissolving in a liquid such as water, salt solution or recycled process solution to form a concentrated calcium chloride solution with crystallized mixture of sodium chloride and potassium chloride even without any evaporation of water just by adding enough solid $CaCl_2$ with the waste products. $CaCl_2$ can also be formed e.g. by addition of lime and hydrochloric acid. In addition to evaporation also other concentration technologies can be used for increasing $CaCl_2$ concentration such as membrane technologies, removing water by precipitation of crystal water with inorganic compounds, etc. The precipitated alkali salts can thereafter be separated according to the principles disclosed in the present application. Of course, additional steps for pretreatment may be required such as removal of magnesium by precipitation in form of $Mg(OH)_2$ at high pH, etc.

The detailed embodiments described above are only a few examples of how a method and arrangement for recovering salts can be arranged. In conclusion, the embodiments described above are to be understood as illustrative examples of the present invention. It will be understood by those skilled in the art that various modifications, combinations and changes may be made to the embodiments without departing from the scope of the present invention. The scope of the present invention is, however, defined by the appended claims.

The invention claimed is:
1. A method for recovery of salts, comprising the steps of:
providing a start material, which when brought in contact with water forms an initial aqueous solution comprising ions of Na, K, Cl and optionally Ca;
treating said start material into an enriched aqueous solution having a concentration of $CaCl_2$ of at least 15% by weight;
said treating optionally comprising reduction of water content; and
said step of treating generating a solid mix of NaCl and KCl;
said treating comprising controlled provision of at least additional ions of Ca into said enriched aqueous solution in excess of what a said initial aqueous solution can provide; and
separating said solid mix of NaCl and KCl from said enriched aqueous solution, giving a depleted aqueous solution comprising ions of Ca and Cl as main dissolved substances;
adding said solid mix of said NaCl and KCl into an aqueous solution, thereby dissolving at least a part of said solid mix of said KCl and NaCl, to form a mixed aqueous solution;
said step of adding said solid mix of said NaCl and KCl into said aqueous solution comprises controlled dissolving said KCl and optionally a part of said NaCl in said aqueous solution at a first temperature to obtain a first concentration of KCl;
said first concentration of KCl being lower than a solubility concentration of KCl at said first temperature; and
separating said NaCl and KCl into individual fractions from said mixed aqueous solution;
said step of separating said NaCl and KCl into individual fractions in turn comprises the steps of:
separating any solid NaCl from said mixed aqueous solution at said first temperature;
lowering, after said step of separating any solid NaCl, a temperature of said mixed aqueous solution to a second temperature lower than said first temperature; and
separating any precipitated KCl from said mixed aqueous solution at said second temperature;
and by the further step of
heating and recycling, after said separating of said any precipitated KCl, at least a part of said mixed aqueous solution for a further said adding of said solid mix of said NaCl and KCl.

2. The method according to claim 1, wherein said controlled provision of at least additional ions of Ca into said initial aqueous solution is performed to give a weight of said solid mix of NaCl and KCl that is lower than the weight of produced $CaCl_2$ solution.

3. The method according to claim 1, wherein said reduction of water content comprises evaporation of water.

4. The method according to claim 1, wherein said step of treating said start material comprises at least one of:
controlling a temperature of said enriched aqueous solution to exceed a solubility temperature for said concentration of $CaCl_2$; and
controlling said concentration of $CaCl_2$ to be lower than a solubility concentration for a prevailing temperature of said enriched aqueous solution.

5. The method according to claim 1, wherein said step of treating said start material comprises causing a precipitation comprising chloride salts comprising Na, K and Ca; and in that said step of separating said solid mix of said NaCl and KCl in turn comprises the steps of:
separating said precipitation comprising chloride salts of Na, K and Ca;
at least partially re-dissolving said separated precipitation comprising chloride salts of Na, K and Ca in an aqueous solution, causing at least salts comprising said Ca to dissolve and give a non-saturated aqueous solution comprising $CaCl_2$; and
separating remaining precipitated NaCl and KCl from said non-saturated water solution of $CaCl_2$.

6. The method according to claim 1, comprising the further step of:
recycling at least a part of said depleted aqueous solution to be used as additives of Ca ions and Cl ions in a further said treating of said start material into an enriched aqueous solution.

7. The method according to claim 1, comprising the further step of:
purifying said depleted aqueous solution from residual alkali salts.

8. The method according to claim 1, wherein said step of providing a start material in turn comprises the steps of:
obtaining a raw aqueous solution comprising ions of Na, K, Cl and optionally Ca; and
pre-treating said raw aqueous solution into said initial aqueous solution by at least one of:
removal of sulfate;
removal of ammonia;
removal of heavy metals; and
neutralization.

9. The method according to claim 1, wherein said step of providing a start material comprises washing of air pollution control by-products with an aqueous solution.

10. The method according to claim 1, wherein said step of providing a start material comprises dissolving of salt containing waste material.

11. An arrangement for recovery of salts, comprising:
an input section; and
a first stage section, comprising a treatment arrangement and a salt mix separator;
said input section being arranged for providing a start material comprising at least one of an initial aqueous solution comprising ions of Na, K, Cl and optionally Ca, and a material, which when brought in contact with water forms an initial aqueous solution comprising ions of Na, K, Cl and optionally Ca to said first stage section;

said treatment arrangement being arranged for treating said start material provided from said input section into an enriched aqueous solution having a concentration of $CaCl_2$ of at least 15% by weight, whereby a solid mix of NaCl and KCl is generated;

said treatment arrangement optionally comprising a water reduction arrangement;

said water reduction arrangement being arranged for removing water from said initial aqueous solution;

said salt mix separator being arranged for separating said solid mix of said NaCl and KCl from said enriched aqueous solution, giving a depleted aqueous solution comprising ions of Ca and Cl as main dissolved substances;

said treatment arrangement comprises an input for additives;

said input for additives being arranged for controlled provision of at least additional ions of Ca into said initial aqueous solution;

a second stage section connected to said first stage section for enabling transferring of said solid mix of said NaCl and KCl, said second stage section comprising:
 a dissolver, arranged for adding said solid mix of said NaCl and KCl into an aqueous solution, thereby dissolving at least a part of said solid mix of said KCl and NaCl, to form a mixed aqueous solution;
 said dissolver is arranged for controlled dissolving said KCl and optionally a part of said NaCl in said aqueous solution at a first temperature to obtain a first concentration of KCl;
 said first concentration of KCl being lower than a solubility concentration of KCl at said first temperature; and
 a separator arrangement, arranged for separating said NaCl and KCl into individual fractions from said mixed aqueous solution said separator arrangement comprises:
 a NaCl separator for separating any solid NaCl from said mixed aqueous solution at said first temperature;
 a temperature controller for lowering, downstream of said NaCl separator, a temperature of said mixed aqueous solution to a second temperature, said second temperature being lower than said first temperature; and
 a KCl separator for separating any precipitated KCl from said mixed aqueous solution at said second temperature;

and by further comprising
a NaCl/KCl recycling arrangement;
said NaCl/KCl recycling arrangement being arranged for heating and recycling, downstream of said KCl separator, at least a part of said mixed aqueous solution to said dissolver.

12. The arrangement according to claim 11, wherein said dissolver is arranged for giving a weight of said solid mix of NaCl and KCl that is lower than the weight of produced $CaCl_2$ solution.

13. The arrangement according to claim 11, wherein said water reduction arrangement comprises an evaporator.

14. The arrangement according to claim 11, wherein said treatment arrangement comprises a dissolution control, arranged for at least one of:
 controlling a temperature of said enriched aqueous solution to exceed a solubility temperature for said concentration of $CaCl_2$; and
 controlling said concentration of $CaCl_2$ to be lower than a solubility concentration for a prevailing temperature of said enriched aqueous solution.

15. The arrangement according to claim 11, wherein said treatment arrangement is arranged for causing a solid mix comprising chloride salts of Na, K and Ca;
 and in that said salt mix separator comprises:
 a first separator arranged for separating said solid mix comprising chloride salts of Na, K and Ca;
 a dissolver connected to said first separator and arranged for at least partially re-dissolving said separated solid mix comprising chloride salts of Na, K and Ca in an aqueous solution, causing at least salts comprising said Ca to dissolve and give a non-saturated water solution comprising $CaCl_2$;
 a second separator connected to said dissolver and arranged for separating remaining precipitated NaCl and KCl from said non-saturated water solution of $CaCl_2$.

16. The arrangement according to claim 11, further comprising a partial return arrangement connecting an output from said salt mix separator and an input to said treatment arrangement of said first stage section, said partial return arrangement being arranged for recycling at least a part of said depleted aqueous solution to be used as additive of Ca ions and Cl ions in said treatment arrangement.

17. The arrangement according to claim 11, further comprising a $CaCl_2$ purifier connected to an output from said salt mix separator, said $CaCl_2$ purifier being arranged for purifying said depleted aqueous solution from residual alkali salts.

18. The arrangement according to claim 11, wherein said input section comprises:
 a supply of a raw aqueous solution comprising ions of Na, K, Cl and optionally Ca; and
 a pre-treating arrangement connected to said supply of said raw aqueous solution, said pre-treating arrangement being arranged for pre-treating said raw aqueous solution into said initial water solution by at least one of:
 a sulfate removal arrangement;
 an ammonia removal arrangement;
 a heavy metal removal arrangement; and
 a neutralization arrangement.

19. The arrangement according to claim 11, wherein said input section comprises an air pollution control by-product washing arrangement.

20. The arrangement according to claim 11, wherein said input section being arranged for receiving said initial aqueous solution from an arrangement for dissolving of salt containing waste material.

* * * * *

UNITED STATES PATENT AND TRADEMARK OFFICE
CERTIFICATE OF CORRECTION

PATENT NO. : 10,773,971 B2  
APPLICATION NO. : 16/064069  
DATED : September 15, 2020  
INVENTOR(S) : Yariv Cohen Page 1 of 1

It is certified that error appears in the above-identified patent and that said Letters Patent is hereby corrected as shown below:

On the Title Page

Item (30), change "1551685" to --1551685-9--.

Signed and Sealed this  
Twenty-seventh Day of October, 2020

Andrei Iancu  
*Director of the United States Patent and Trademark Office*